United States Patent
Suyama et al.

(10) Patent No.: US 6,932,069 B2
(45) Date of Patent: Aug. 23, 2005

(54) AIR FUEL RATIO CONTROL APPARATUS FOR AN INTERNAL COMBUSTION ENGINE

(75) Inventors: Kingo Suyama, Susono (JP); Koichiro Fukuda, Sunto-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/956,113

(22) Filed: Oct. 4, 2004

(65) Prior Publication Data

US 2005/0076635 A1 Apr. 14, 2005

(30) Foreign Application Priority Data

Oct. 9, 2003 (JP) .................................... 2003-350993
Dec. 17, 2003 (JP) .................................... 2003-419841

(51) Int. Cl.[7] .............................................. F02D 41/00
(52) U.S. Cl. ..................................... 123/674; 123/285
(58) Field of Search .................................. 123/299, 305, 123/674; 60/285, 286, 295, 301

(56) References Cited

U.S. PATENT DOCUMENTS 6,305,161 B1 * 10/2001 Takanohashi et al. ......... 60/301
6,438,947 B2 * 8/2002 Ludwig et al. ............... 60/285

FOREIGN PATENT DOCUMENTS

| JP | A 7-189797 | 7/1995 |
| JP | A 11-44211 | 2/1999 |
| JP | A 2002-89350 | 3/2002 |
| JP | A 2002-188430 | 7/2002 |

* cited by examiner

Primary Examiner—Mahmoud Gimie
(74) Attorney, Agent, or Firm—Oliff & Berridge, PLC

(57) ABSTRACT

An air fuel ratio control apparatus for an internal combustion engine can improve learning accuracy in the air fuel ratio control even if the air fuel ratio of a mixture detected by an air fuel ratio detection device shifts from an actual air fuel ratio thereof. The apparatus controls the air fuel ratio of an exhaust gas flowing into an exhaust gas purification device based on an air fuel ratio feedback value and an air fuel ratio learning value. A temperature detection device detects the temperature of the exhaust gas purification device. A determination device determines, based on a difference between a detection value of the temperature detection device and a target temperature, that the air fuel ratio detection device shifts to a rich or lean side. The update of the air fuel ratio learning value is inhibited when the air fuel ratio detection device shifts to a rich or lean side.

15 Claims, 16 Drawing Sheets

Fig. 2
Fig. 2A
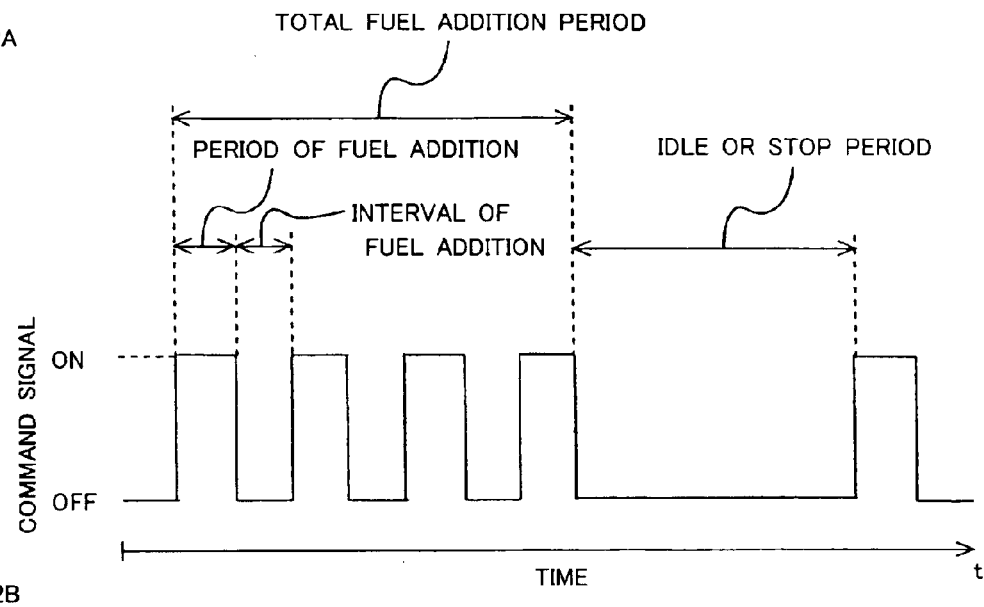
Fig. 2B
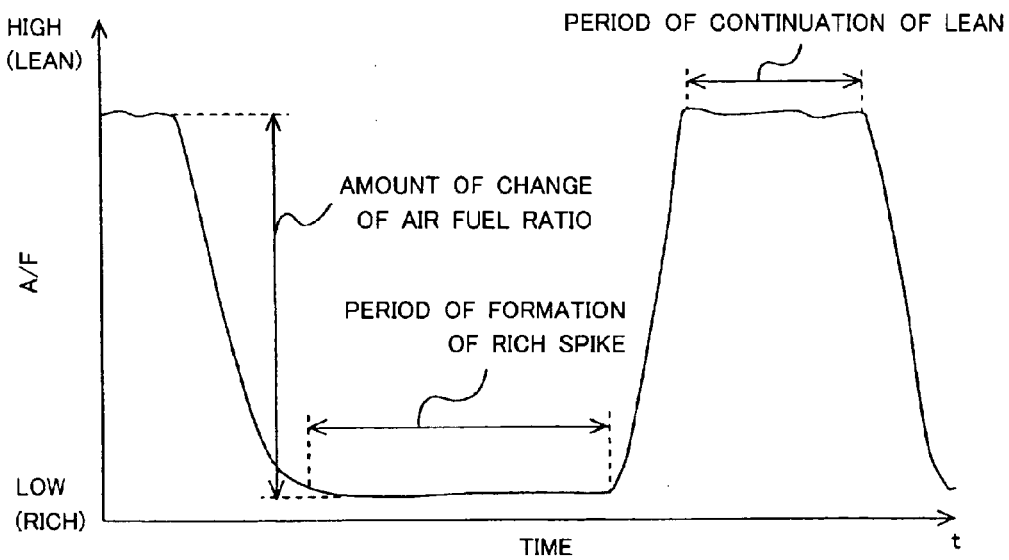

Fig. 5

| | CORRECTION FACTOR INCREASE REQUEST | CORRECTION FACTOR UNCHANGED | CORRECTION FACTOR DECREASE REQUEST |
|---|---|---|---|
| TEMPERATURE LEARNING VALUE + SIDE | PERMISSION OF AIR FUEL RATIO LEARNING VALUE UPDATE / SHORTAGE OF FUEL ADDITION AMOUNT | | INHIBITION OF UPDATE / SENSOR'S RICH SHIFT |
| TEMPERATURE LEARNING VALUE UNCHANGED | PERMISSION OF AIR FUEL RATIO LEARNING VALUE UPDATE / SENSOR'S LEAN SHIFT | | INHIBITION OF UPDATE / SENSOR'S RICH SHIFT |
| TEMPERATURE LEARNING VALUE − SIDE | INHIBITION OF UPDATE / SENSOR'S LEAN SHIFT | | PERMISSION OF AIR FUEL RATIO LEARNING VALUE UPDATE / EXCESS OF FUEL ADDITION AMOUNT |

Fig. 12

| | Air fuel ratio learning reasons | Absence of correction - Merits | Absence of correction - Demerits | Presence of correction - Merits | Presence of correction - Demerits | Determination |
|---|---|---|---|---|---|---|
| Fuel addition amount increase correction | Clogging of fuel addition valve | Coincidence with target | — | Small temperature variation | Decreased amount of S released | Perform correction |
| Fuel addition amount increase correction | Lean basic air fuel ratio | — | Overheat of NOx catalyst | Coincidence with target | — | Perform correction |
| Fuel addition amount decrease correction | Large fuel addition amount | Coincidence with target | — | — | Overheat of NOx catalyst | Not perform correction |
| Fuel addition amount decrease correction | Rich basic air fuel ratio | Small temperature variation | Decreased amount of S released | Coincidence with target | — | Not perform correction |

AIR FUEL RATIO CONTROL APPARATUS FOR AN INTERNAL COMBUSTION ENGINE

BACKGROUND OF THE INVENTION

1. Field of the Invention

The present invention relates to an air fuel ratio control apparatus for an internal combustion engine.

2. Description of the Related Art

There has hitherto been known a technique in which an NOx storage reduction catalyst (hereinafter referred to as "NOx catalyst") is disposed on an exhaust passage of an internal combustion engine, so that nitrogen oxides (NOx) in an exhaust gas is occluded into the NOx catalyst when the exhaust gas is in an oxidative atmosphere, whereas the NOx occluded in the NOx catalyst is reduced to purify the NOx in the exhaust gas when the exhaust gas becomes a reducing atmosphere.

In addition, another technique has also been known in which similar to the case of NOx, poisoning of an NOx catalyst due to sulfur components occluded therein is recovered by decreasing the air fuel ratio of a mixture after the temperature of the NOx catalyst has been raised (see, for example, Patent Document 1: Japanese patent application laid-open No. 11-44211).

Here, note that there are following documents that are relevant to the present invention.

Patent Document 2: Japanese patent application laid-open No. 2002-89350

Patent document 3: Japanese patent application laid-open No. 7-189797

Patent document 4: Japanese patent application laid-open No. 2002-188430

Incidentally, sulfur poisoning recovery processing can be performed most efficiently and quickly when the temperature of the NOx catalyst and the condition of the air fuel ratio in the NOx catalyst are optimal.

In this regard, it becomes possible to obtain an optimal temperature of the NOx catalyst and an optimal air fuel ratio of the mixture by detecting the temperature of the NOx catalyst and the air fuel ratio of the mixture by means of sensors thereby to control the amount of fuel to be added in a feedback manner, and by further learning the feedback value of the added fuel amount thus feedback controlled, but there might be cases where the temperatures of the NOx catalyst and the air fuel mixture are not able to be detected in an accurate manner due to the characteristics of the sensors.

SUMMARY OF THE INVENTION

Accordingly, the present invention has been made in view of the above-mentioned problems, and has for its object to provide a technique that can improve learning accuracy in the air fuel ratio control even if the air fuel ratio of a mixture detected by an air fuel ratio detection device shifts or deviates from an actual air fuel ratio thereof in an air fuel ratio control apparatus for an internal combustion engine.

In order to achieve the above object, an air fuel ratio control apparatus for an internal combustion engine according to a first aspect of the present invention adopted the following technique.

Specifically, in the first aspect of the present invention, there is provided an air fuel ratio control apparatus for an internal combustion engine, including an exhaust gas purification device provided on an exhaust passage of an internal combustion engine, an air fuel ratio detection device disposed at a location downstream of the exhaust gas purification device, an air fuel ratio feedback value calculation device that calculates an air fuel ratio feedback value based on a difference between an air fuel ratio of a mixture detected by the air fuel ratio detection device and a target air fuel ratio, an air fuel ratio learning value calculation device that calculates an air fuel ratio learning value based on the air fuel ratio feedback value and the target air fuel ratio, and an exhaust gas air fuel ratio control device that controls the air fuel ratio of an exhaust gas flowing into the exhaust gas purification device based on the air fuel ratio feedback value and the air fuel ratio learning value. The apparatus comprises: a temperature detection device that detects the temperature of the exhaust gas purification device; a determination device that makes a determination that when a difference between a detection value of the temperature detection device and a target temperature is greater than a specified range, the detection value of the air fuel ratio detection device shifts to a rich side, whereas when the difference is less than the specified range, the detection value of the air fuel ratio detection device shifts to a lean side; and an air fuel ratio learning value update inhibition device that inhibits the update of the air fuel ratio learning value when the determination device determines that the detection value of the air fuel ratio detection device shifts to a rich side or to a lean side.

One major feature of the present invention focuses attention on the fact that a difference between the air fuel ratio detected by the air fuel ratio detection device and the actual air fuel ratio is associated with a difference between the target temperature of the exhaust gas purification device and the temperature detected by the temperature detection device, determines, based on this temperature difference, whether the detection result of the air fuel ratio detection device is right, and further determines, based on this result, whether to update the air fuel ratio learning value.

Here, with the provision of the air fuel ratio detection device, by changing the amount of fuel supplied to the exhaust gas based on the air fuel ratio detected by the air fuel ratio detection device, the air fuel ratio of the exhaust gas passing through the NOx catalyst can be kept at a target air fuel ratio. In this case, the amount of fuel supplied to the exhaust gas is corrected through feedback so as to eliminate the difference between the air fuel ratio detected by the air fuel ratio detection device and the target air fuel ratio, and the value used for this correction (hereinafter referred to simply as a corrected value) is stored. Here, note that the value used to correct the amount of fuel supplied to the exhaust gas so as to eliminate the difference between the air fuel ratio detected by the air fuel ratio detection device and the target air fuel ratio is called an air fuel ratio feedback value.

When fuel is supplied next time, the supply of fuel is carried out by the use of this corrected value applied in advance so that the air fuel ratio detected by the air fuel ratio detection device is brought close to the target air fuel ratio. This is called an air fuel ratio learning, and the corrected value stored is called an air fuel ratio learning value.

Incidentally, when the air fuel ratio detected by the air fuel ratio detection device shifts or deviates to a lean side from the actual air fuel ratio (hereinafter referred to as a lean shift), the amount of fuel to be supplied is increased by the feedback control. However, the air fuel ratio is not actually lean, and hence fuel is excessively supplied, so a lot of fuel reacts in the exhaust gas purification device, and the temperature detected by the temperature detection device rises. Here, note that since the temperature detection device detects the temperature of the exhaust gas at a downstream side of the exhaust gas purification device, the temperature detected by the temperature detection device becomes lower than the temperature of the exhaust gas purification device. Accordingly, as the temperature detected by the temperature detection device rises, a difference between the target temperature of the exhaust gas purification device and the temperature detected by the temperature detection device becomes smaller.

Accordingly, when this temperature difference is smaller than a specified range, the determination device determines that the air fuel ratio detected by the air fuel ratio detection device shifts or deviates to a lean side from the actual air fuel ratio, and the air fuel ratio learning value update inhibition device inhibits the update of the air fuel ratio learning value.

In addition, when the air fuel ratio detected by the air fuel ratio detection device shifts or deviates to a rich side from the actual air fuel ratio (hereinafter referred to as a rich shift), the amount of fuel to be supplied is decreased by the feedback control. However, the air fuel ratio is not actually rich, and hence the fuel of fuel supplied become short, so the amount of fuel reacting in the exhaust gas purification device decreases, and the temperature detected by the temperature detection device lowers. As a result, the difference between the target temperature of the exhaust gas purification device and the temperature detected by the temperature detection device becomes large.

Accordingly, when this temperature difference is greater than the specified range, the determination device determines that the air fuel ratio detected by the air fuel ratio detection device shifts or deviates to a rich side from the actual air fuel ratio, and the air fuel ratio learning value update inhibition device inhibits the update of the air fuel ratio learning value.

Thus, since the update of the air fuel ratio learning value is inhibited by the air fuel ratio learning value update inhibition device when the air fuel ratio detection device causes a lean shift or a rich shift, it is possible to suppress reduction in the accuracy of the air fuel ratio control due to mislearning.

Here, note that the specified range can be set as a range in which the air fuel ratio detection device does not cause a lean shift or a rich shift or a range in which there will be no problem even if such a lean shift or a rich shift occurs.

In addition, in order to achieve the above object, an air fuel ratio control apparatus for an internal combustion engine according to a second aspect of the present invention adopts the following technique. Specifically, in the second aspect of the present invention, there is provided a air fuel ratio control apparatus for an internal combustion engine, including an NOx storage reduction catalyst provided on an exhaust passage of an internal combustion engine, a fuel supply device that supplies fuel at a location upstream of the NOx storage reduction catalyst, an air fuel ratio detection device that detects the air fuel ratio of an exhaust gas passing through the NOx storage reduction catalyst, and a temperature detection device that detects the temperature of the NOx storage reduction catalyst. When sulfur components occluded in the NOx storage reduction catalyst become more than or equal to a specified amount, the temperature of the NOx storage reduction catalyst is brought into a specified temperature, and the sulfur components occluded in the NOx storage reduction catalyst are caused to release therefrom by controlling the amount of fuel supplied from the fuel supply device and/or the interval of fuel supply based on detection values of the air fuel ratio detection device and the temperature detection device so as to bring the air fuel ratio of the exhaust gas passing through the NOx storage reduction catalyst into a stoichiometric air fuel ratio or a specified rich air fuel ratio. The air fuel ratio learning value is updated only when an increase or decrease in the amount of fuel and/or an increase or decrease in the fuel supply interval, respectively obtained from a temperature learning value and an air fuel ratio learning value, coincide with each other, the temperature learning value being calculated so as to change a basic value of the amount of fuel and/or a basic value of the fuel supply interval from a difference between the specified temperature and the temperature detected by the temperature detection device, the air fuel ratio learning value being calculated so as to change a basic value of the amount of fuel and/or a basic value of the fuel supply interval from a difference between the specified air fuel ratio and the air fuel ratio detected by the air fuel ratio detection device.

Another major feature of the present invention is to suppress mislearning of the air fuel ratio owing to the lean or rich shift of the air fuel ratio detection device by updating the air fuel ratio learning value only when the results of the change (i.e., increase or decrease) of fuel and/or the magnitude (i.e., long or short) of the interval of fuel supply respectively obtained from the temperature learning value and the air fuel ratio learning value are equal to each other.

Here, with the provision of the temperature detection device, by changing the amount of fuel supplied to the exhaust gas and/or the interval of fuel supply based on the temperature of the NOx catalyst detected by the temperature detection device, the temperature of the NOx catalyst can be kept constant. In this case, the amount of fuel supplied to the exhaust gas and/or the interval of fuel supply is corrected through feedback so as to eliminate the difference between the temperature detected by the temperature detection device and the target temperature, and the value (hereinafter referred to simply as a corrected value) used for this correction is stored. When fuel is supplied next time, the supply of fuel is carried out by the use of this corrected value applied in advance so that the temperature detected by the temperature detection device is brought close to the target temperature. Hereinafter, this is called a temperature learning and the corrected value at this time is called a temperature learning value.

Incidentally, in addition to the temperature learning, the air fuel ratio learning might be performed at the same time. In this case, if it is determined whether to update the air fuel ratio learning value after the temperature of the NOx catalyst has actually changed, there will be a fear that when fuel is excessively supplied, the NOx catalyst might overheat before the update of the air fuel ratio learning value. Accordingly, in the present invention, a determination as to whether the air fuel ratio learning value is updated may be made based on the history of the change of the temperature learning value, and when the air fuel ratio learning value is updated, the temperature learning value is returned to its unupdated state so that the bed temperature of the NOx catalyst is prevented from being changed due to the update of the air fuel ratio learning value.

Here, when fuel is corrected to an increase side by the temperature learning, and when fuel is also corrected to an increase side by the feedback control of the air fuel ratio, it is determined that the amount of fuel supplied becomes insufficient, so the air fuel ratio learning value is updated so as to increase the amount of fuel supplied. In addition, when fuel is corrected to a decrease side by the temperature learning, and when fuel is also corrected to a decrease side by the feedback control of the air fuel ratio, it is determined that the amount of fuel supplied is excessive, so the air fuel ratio learning value is updated so as to decrease the amount of fuel supplied. Other than the above, when the change (i.e., increase or decrease) of fuel under the temperature learning control does not coincide with that under the air fuel ratio feedback control, it is determined that the air fuel ratio detection device will cause a lean shift or a rich shift, so the update of the air fuel ratio learning value is not carried out.

As a result, since the update of the air fuel ratio learning value is not performed when the air fuel ratio detection device causes a lean shift or a rich shift, it is possible to suppress reduction in the accuracy of the air fuel ratio control due to mislearning.

Moreover, in order to achieve the above object, an air fuel ratio control apparatus for an internal combustion engine according to a third aspect of the present invention adopts the following technique. Specifically, in the third aspect of the present invention, there is provided a air fuel ratio control apparatus for an internal combustion engine, including an exhaust gas purification device provided on an exhaust passage of an internal combustion engine, an air fuel ratio detection device disposed at a location downstream of the exhaust gas purification device, an air fuel ratio feedback value calculation device that calculates an air fuel ratio feedback value based on a difference between an air fuel ratio of a mixture detected by the air fuel ratio detection device and a target air fuel ratio, an air fuel ratio learning value calculation device that calculates an air fuel ratio learning value based on the air fuel ratio feedback value and the target air fuel ratio, and an exhaust gas air fuel ratio control device that controls the air fuel ratio of an exhaust gas flowing into the exhaust gas purification device based on the air fuel ratio feedback value and the air fuel ratio learning value. The apparatus comprises: a temperature detection device that detects the temperature of the exhaust gas purification device; a temperature feedback value calculation device that calculates a temperature feedback value based on a difference between the temperature of the exhaust gas purification device detected by the temperature detection device and a target temperature; a temperature learning value calculation device that calculates a temperature learning value based on the temperature feedback value calculated by the temperature feedback value calculation device and the target temperature; and an air fuel ratio learning value update determination device that determines whether the air fuel ratio learning value is updated, based on an increase or a decrease in the amount of fuel and/or an increase or a decrease in the interval of fuel supply, respectively obtained from the air fuel ratio learning value, which is calculated by the air fuel ratio learning value calculation device, and the temperature learning value, which is calculated by the temperature learning value calculation device.

A further major feature of the present invention is to suppress mislearning of the air fuel ratio owing to the lean or rich shift of the air fuel ratio detection device by making a determination as to whether the air fuel ratio learning value is updated, based on the results of the change (i.e., increase or decrease) of fuel and/or the magnitude (i.e., long or short) of the interval of fuel supply respectively obtained from the temperature learning value and the air fuel ratio learning value.

Here, note that the temperature feedback value is a value to correct the amount of fuel supplied to the exhaust gas and/or the fuel supply interval so as to eliminate the difference between the temperature detected by the temperature detection device and the target temperature.

Incidentally, when the temperature learning and the air fuel ratio learning are performed, a change (i.e., increase or decrease) in the amount of fuel and/or a change (i.e., lengthening or shortening) in the fuel supply interval become equal to each other. However, the results might conflict with each other due to a lean shift or a rich shift of the air fuel ratio detection device. Accordingly, based on such results, it becomes possible to determine the lean shift or rich shift of the air fuel ratio detection device, and further to determine whether the air fuel ratio learning value is updated.

Preferably, in the present invention, the air fuel ratio learning value update determination device updates the air fuel ratio learning value only when an increase or a decrease in the amount of fuel and/or an increase or a decrease in the interval of fuel supply, respectively obtained by the air fuel ratio learning value calculated by the air fuel ratio learning value calculation device and the temperature learning value calculated by the temperature learning value calculation device, coincide with each other.

Here, when fuel is corrected to an increase side by the temperature learning, and when fuel is also corrected to an increase side by the feedback control of the air fuel ratio, it is determined that the amount of fuel supplied becomes insufficient, so the air fuel ratio learning value is updated so as to increase the amount of fuel supplied. In addition, when fuel is corrected to a decrease side by the temperature learning, and when fuel is also corrected to a decrease side by the feedback control of the air fuel ratio, it is determined that the amount of fuel supplied is excessive, so the air fuel ratio learning value is updated so as to decrease the amount of fuel supplied. When the change (i.e., increase or decrease) of fuel under the temperature learning control does not coincide with that under the air fuel ratio feedback control, it is determined that the air fuel ratio detection device will cause a lean shift or a rich shift, so the update of the air fuel ratio learning value is not carried out.

As a result, since the update of the air fuel ratio learning value is not performed when the air fuel ratio detection device causes a lean shift or a rich shift, it is possible to suppress reduction in the accuracy of the air fuel ratio control due to mislearning.

Preferably, in the present invention, the air fuel ratio control apparatus for an internal combustion engine further comprises: a determination device that makes a determination that when a difference between the detection value of the temperature detection device and the target temperature is greater than a specified range, the detection value of the air fuel ratio detection device shifts to a rich side, whereas when the difference is less than the specified range, the detection value of the air fuel ratio detection device shifts to a lean side; and an air fuel ratio learning value update inhibition device that inhibits the update of the air fuel ratio learning value when the determination device determines that the detection value of the air fuel ratio detection device shifts to a rich side or to a lean side.

Preferably, in the second aspect of the present invention, the amount of fuel supplied and/or the interval of fuel supply are controlled based on the air fuel ratio learning value and the temperature learning value.

Preferably, in the third aspect of the present invention, the exhaust gas air fuel ratio control device comprises a fuel supply device disposed at a location upstream of the exhaust gas purification device for controlling the amount of fuel supplied from the fuel supply device and/or the interval of fuel supply based on the air fuel ratio feedback value, the air fuel ratio learning value, the temperature feedback value and the temperature learning value.

Specifically, fuel is supplied to the exhaust gas by the fuel supply device, so that the air fuel ratio of the exhaust gas is thereby decreased. In addition, when fuel is intermittently supplied, the amount of fuel supplied can be reduced by lengthening or increasing the period in which fuel is not supplied, i.e., the fuel supply interval. As a result, the air fuel ratio of the exhaust gas can be raised or increased. On the other hand, the amount of fuel supplied can be increased by shortening the fuel supply interval, whereby the air fuel ratio of the exhaust gas can be lowered.

Preferably, in the third aspect of the present invention, when the determination device makes a determination that the detection value of the air fuel ratio detection device shifts to a lean side from an actual air fuel ratio, correction of the fuel supply amount and/or the fuel supply interval toward a side to make the air fuel ratio lower is limited.

Thus, when the detection value of the air fuel ratio detection device shifts or deviates to a lean side, the amount of fuel addition is increased by the feedback control of the fuel addition amount even if the air fuel ratio learning value is not updated. As a result, the increase in the amount of fuel addition according to the feedback control is limited since there is a fear that the air fuel ratio of the exhaust gas might become too lower, thus generating white smoke.

Preferably, in the third aspect of the present invention, when the determination device determines that the detection value of the air fuel ratio detection device shifts to a rich side from an actual air fuel ratio, correction of the fuel supply amount and/or the fuel supply interval toward a side to make the air fuel ratio higher is not limited.

Thus, when the detection value of the air fuel ratio detection device becomes richer than the target value, the amount of fuel addition is decreased by the feedback control of the fuel addition amount even if the air fuel ratio learning value is not updated. At this time, if the decrease in the amount of fuel addition is limited as in the case of occurrence of a lean shift, the decrease of fuel will not be performed even when the air fuel ratio actually becomes rich, as a result of which there will be a fear that white smoke might be generated. In addition, if the decrease in the amount of fuel addition is limited when a rich shift has actually occurred, there will be a fear that the fuel air ratio might not reach the target air fuel ratio, thus making it impossible to perform recovery from sulfur poisoning, etc. In this regard, according to the present invention, to suppress the generation of white smoke is given higher priority than to make the air fuel ratio reach the target air fuel ratio, and when the detection value of the air fuel ratio detection device becomes richer than the target value, the amount of fuel addition is decreased by the feedback control of the fuel addition amount.

Preferably, in the second or third aspect of the present invention, the air fuel ratio learning value can be prevented from changing at the time when the temperature learning value is calculated.

Here, note that if the air fuel ratio learning value changes at the time of performing temperature learning, the temperature of the NOx catalyst accordingly varies, so the temperature learning value also changes. In this regard, by preventing the air fuel ratio learning value from changing during the temperature learning, it is possible to perform the temperature learning without being subjected to the influence of the change in the air fuel ratio learning value.

Preferably, in the second aspect of the present invention, when the amount of fuel supplied from the fuel supply device is controlled to increase based on the air fuel ratio learning value, the time within which the air fuel ratio of the exhaust gas passing through the NOx storage reduction catalyst is brought into a stoichiometric air fuel ratio or a specified rich air fuel ratio is made shorter in accordance with the increasing fuel supply amount, whereas when the amount of fuel supplied from the fuel supply device is controlled to decrease, the time within which the stoichiometric air fuel ratio or the specified rich air fuel ratio is reached is not changed before and after the amount of fuel supplied is decreased.

Further, in the third aspect of the present invention, when the amount of fuel supplied from the fuel supply device is controlled to increase based on the air fuel ratio learning value, the time within which the air fuel ratio of the exhaust gas flowing into the exhaust gas purification device is brought into a target air fuel ratio due to the fuel supplied thereto from the fuel supply device is made shorter in accordance with the increasing fuel supply amount, whereas when the amount of fuel supplied from the fuel supply device is controlled to decrease, the time within which the target air fuel ratio is reached is not changed before and after the amount of fuel supplied is decreased.

Incidentally, if the air fuel ratio of the exhaust gas emitted from the internal combustion engine (hereinafter referred to as a basic air fuel ratio) shifts or deviates from the basic air fuel ratio which becomes the target air fuel ratio, the air fuel ratio of the exhaust gas flowing into the exhaust gas purification device or the NOx storage reduction catalyst will be caused to shift or deviate from the target air fuel ratio (specified air fuel ratio) by the amount of shift of the basic air fuel ratio even if the amount of fuel supplied from the fuel supply device is the target amount of fuel supply.

In this regard, by correcting the amount of fuel supplied from the fuel supply device by the amount of shift of the basic air fuel ratio, it is possible to bring the air fuel ratio of the exhaust gas flowing into the exhaust gas purification device or the NOx storage reduction catalyst into the target air fuel ratio (specified air fuel ratio) during the time when fuel is being supplied from the fuel supply device.

On the other hand, even in case where the amount of fuel supplied from the fuel supply device has not become the target amount of fuel supply when fuel is supplied from the fuel supply device so as to bring the air fuel ratio into the target air fuel ratio (specified air fuel ratio), the air fuel ratio of the exhaust gas flowing into the exhaust gas purification device or the NOx storage reduction catalyst during the supply of fuel will shift from the target air fuel ratio (specified air fuel ratio). In this case, by correcting the amount of fuel supplied from the fuel supply device, it is possible to bring the air fuel ratio of the exhaust gas flowing into the exhaust gas purification device or the NOx storage reduction catalyst into the target air fuel ratio (specified air fuel ratio).

Thus, when the amount of fuel supplied from the fuel supply device under the learning control of the air fuel ratio is corrected, a correction resulting from a shift of the basic air fuel ratio and a correction resulting from the amount of fuel supplied from the fuel supply device not becoming the target amount of fuel supply are considered, but it is difficult to distinguish these corrections to the fuel supply amount from each other under the learning control of the air fuel ratio. Accordingly, it is necessary to perform the correction of the amount of fuel supplied from the fuel supply device by the learning of the air fuel ratio without distinguishing between the correction resulting from a shift of the basic air fuel ratio and the correction resulting from the amount of fuel supplied from the fuel supply device not becoming the target amount of fuel supply.

Here, in case where the basic air fuel ratio becomes leaner than the target air fuel ratio, the amount of fuel to be supplied from the fuel supply device is increased, but in this case, the amount of fuel supply itself will increase, and hence the exhaust gas purification device or the NOx storage reduction catalyst might overheat. Therefore, it is necessary to shorten the time within which the target air fuel ratio (specified air fuel ratio) is reached, i.e., the time of fuel supply by the fuel supply device. On the other hand, in the case of the correction resulting from the amount of fuel supplied from the fuel supply device being less than the target fuel supply amount, the amount of fuel supply becomes an amount originally targeted, so the time within which the target air fuel ratio (specified air fuel ratio) is reached need not be changed.

From the above, it will be understood that when a correction to increase the amount of fuel to be supplied from the fuel supply device is performed, the overheat of the exhaust gas purification device and the NOx storage reduction catalyst can be suppressed by shortening the time within which the target air fuel ratio (specified air fuel ratio) is reached. In addition, the more the amount of fuel supplied from the fuel supply device, the higher the temperatures of the exhaust gas purification device and the NOx storage reduction catalyst become. As a result, the overheat of the exhaust gas purification device and the NOx storage reduction catalyst can be suppressed by shortening the time, within which the air fuel ratio (specified air fuel ratio) is reached during the fuel supply, in accordance with the increasing amount of fuel supply.

On the other hand, when the basic air fuel ratio becomes richer than the target value, the amount of fuel to be supplied from the fuel supply device is decreased, but in this case, the amount of fuel supplied itself will decrease, so there is no fear that the exhaust gas purification device and the NOx storage reduction catalyst might overheat. Accordingly, by extending or increasing, through the supply of fuel, the time within which the target air fuel ratio (specified air fuel ratio) is reached, the exhaust gas purification device and the NOx storage reduction catalyst can be brought into target temperatures, respectively. On the other hand, when the correction of the fuel supply amount resulting from the amount of fuel supplied from the fuel supply device being more than the target value is performed, the amount of fuel supply is brought into the originally targeted amount according to that correction, so the exhaust gas purification device and the NOx storage reduction catalyst become the target temperatures. In this connection, it is to be noted that if the time, within which the target air fuel ratio (specified air fuel ratio) is reached, is extended or increased through the supply of fuel, there will be a fear that the exhaust gas purification device and the NOx storage reduction catalyst might overheat.

From the above, it will be understood that when a correction to decrease the amount of fuel to be supplied from the fuel supply device is performed, the overheat of the exhaust gas purification device and the NOx storage reduction catalyst can be suppressed by making unchanged the time within which the target air fuel ratio (specified air fuel ratio) is reached.

In the above-mentioned aspects of the present invention, even in case where the amount of fuel supplied from the fuel supply device is increased, the release of sulfur components from the NOx storage reduction catalyst due to the fuel supplied from the fuel supply device can be interrupted when the time, within which the specified air fuel ratio is reached, is shortened or decreased less than or equal to a predetermined time.

Preferably, when the amount of fuel supplied from the fuel supply device is increased, and when the time within which the air fuel ratio of the exhaust gas flowing into the exhaust gas purification device is brought into a target air fuel ratio due to the fuel supplied thereto from the fuel supply device becomes less than or equal to a predetermined time due to the shortening of the time within which the target air fuel ratio is reached, the supply of fuel from the fuel supply device is interrupted.

Here, note that it takes time from when the air fuel ratio of the exhaust gas flowing into the exhaust gas purification device or the NOx storage reduction catalyst has become the target air fuel ratio during the supply of fuel until its effect or result comes to appear. For example, in the case of the NOx storage reduction catalyst, the release of sulfur components therefrom does not start immediately when the air fuel ratio becomes a specified air fuel ratio at which the sulfur components contained in the NOx catalyst can be released. Thus, if the time, within which the target air fuel ratio (specified air fuel ratio) during the supply of fuel is reached, becomes equal to or shorter than the time in which the effect or result makes appearance, there will be almost no effect as the target air fuel ratio (specified air fuel ratio) but also fuel mileage is deteriorated. Therefore, the time until the effect appears is set as the predetermined time, and when the time within which the target air fuel ratio (specified air fuel ratio) during the supply of fuel becomes equal to or less than this predetermined time, the release of sulfur components is interrupted or the supply of fuel from the fuel supply device is interrupted. As a consequence, deterioration in fuel mileage or consumption can be suppressed.

In general, in an air fuel ratio control apparatus for an internal combustion engine according to the present invention, highly accurate learning control can be performed in the feedback control of the amount of fuel supplied to an exhaust system and/or the fuel supply interval using an air fuel ratio detection device.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIGS. 2A and 2B are timing charts showing the waveform of a command signal sent from an ECU to a fuel addition valve and a change in the air fuel ratio corresponding to the waveform, respectively, on the same time axis, wherein FIG. 2A shows the command waveform of the ECU and FIG. 2B shows the air fuel ratio.

FIG. 5 is a view showing the relation among temperature learning values, air fuel ratio learning values, and the results of update determination of the air fuel ratio learning values.

FIG. 12 is a view showing the relation among amounts of correction for the amount of fuel to be added, merits and demerits according to the presence or absence of a correction of the total period of fuel addition (rich time) with respect to an air fuel ratio learning factor at that time, and a determination whether the total period of fuel addition is finally corrected.

DESCRIPTION OF THE PREFERRED EMBODIMENTS

Hereinafter, preferred embodiments of an air fuel ratio control apparatus for an internal combustion engine according to the present invention will be described while referring to the accompanying drawings.

Embodiment 1

Figure 1:
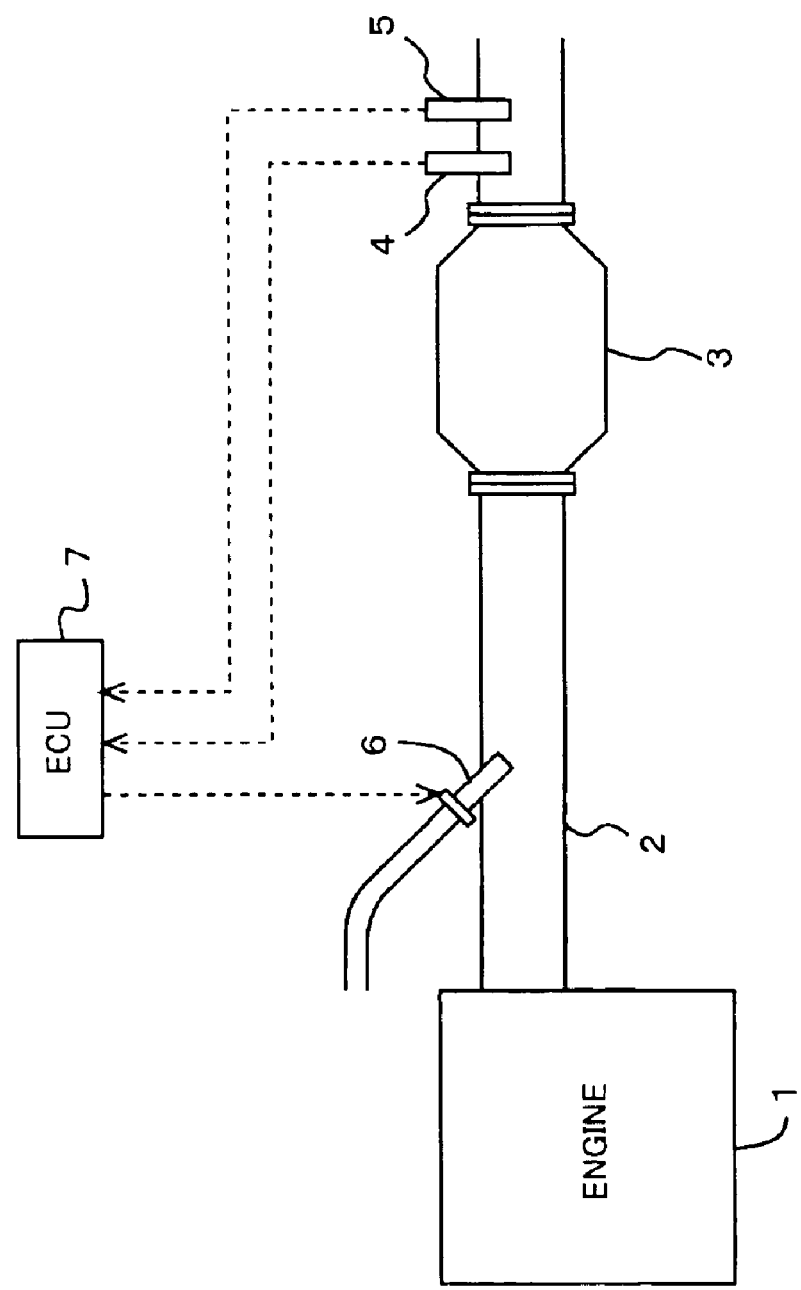
FIG. 1 is a view showing the schematic construction of an internal combustion engine with a fuel supply system to which an air fuel ratio control apparatus for an internal combustion engine according to the present invention is applied.
Figure 15:
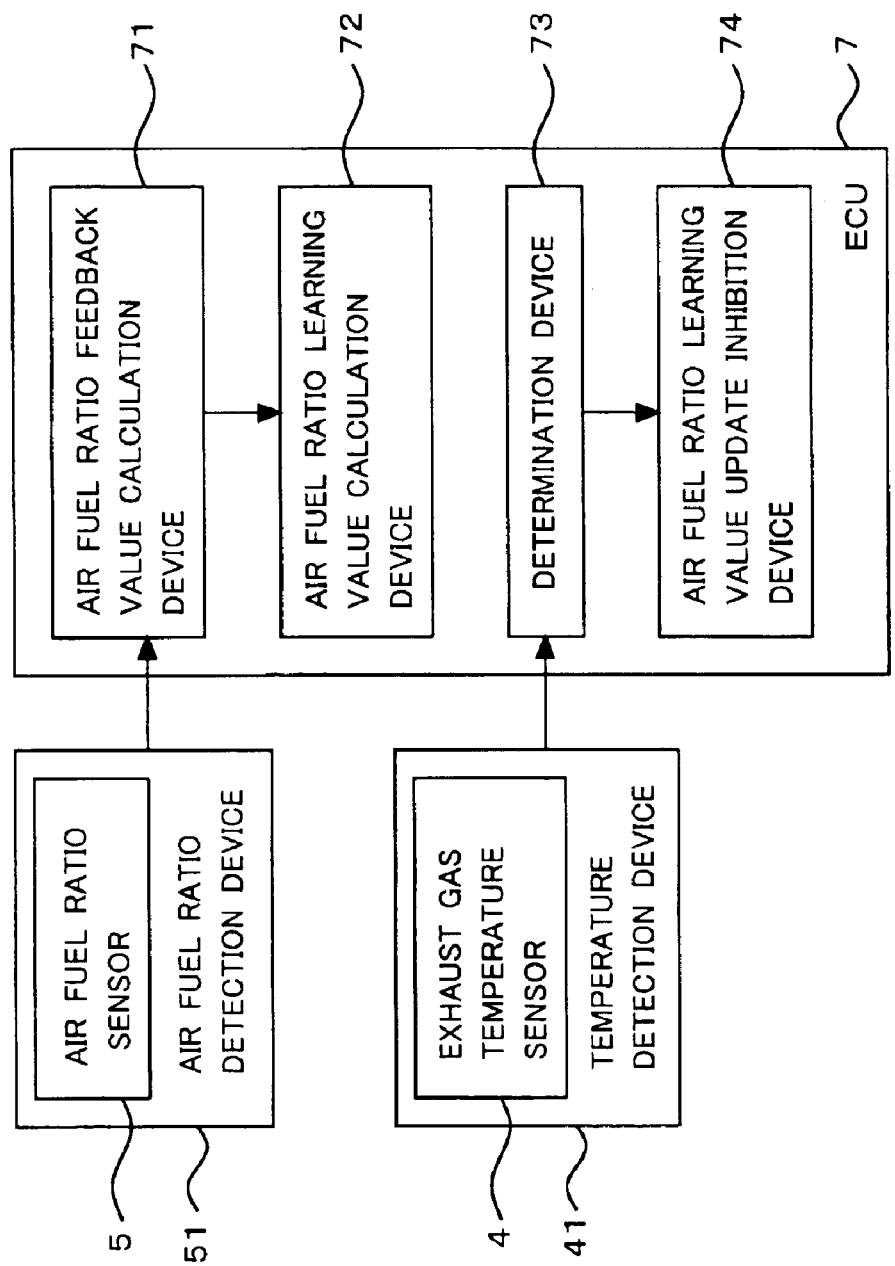
FIG. 15 is a block diagram showing the relation between component elements according to the first embodiment of the present invention.

FIG. 1 illustrates the schematic construction of an internal combustion engine 1 with an exhaust system to which an air fuel ratio control apparatus for an internal combustion engine according to a first embodiment of the present invention is applied. In addition, FIG. 15 is a block diagram that illustrates the relation between component elements according to this embodiment.

The internal combustion engine (hereinafter also referred to simply as an engine) 1 illustrated in FIG. 1 is a water-cooled four-cycle diesel engine. Connected with the internal combustion engine 1 is an exhaust passage 2 which leads at its one or upstream end to a combustion chamber of each engine cylinder, and at its other or downstream end to the atmosphere.

An NOx storage reduction catalyst 3 (hereinafter simply referred to as an NOx catalyst) is arranged on the exhaust passage 2. The NOx storage reduction catalyst 3 in this embodiment corresponds to an exhaust gas purification device in the present invention.

The NOx catalyst 3 has a function to occlude NOx in the exhaust gas when the oxygen concentration of an exhaust gas flowing into the NOx catalyst 3 is high, and to reduce the NOx occluded in the NOx catalyst 3 when the oxygen concentration of the incoming exhaust gas decreases and when there exists a reducing agent.

In addition, on the exhaust passage 2 at locations downstream of the NOx catalyst 3, there are mounted an exhaust gas temperature sensor 4 for detecting the temperature of the exhaust gas passing through the exhaust passage 2 and an air fuel ratio sensor 5 for detecting the air fuel ratio of the exhaust gas passing through the exhaust passage 2. Here, note that the exhaust gas temperature sensor 4 in this embodiment corresponds to a temperature detection device 41 in the present invention, and the air fuel ratio sensor 5 in this embodiment corresponds to an air fuel ratio detection device 51 in the present invention.

When the internal combustion engine 1 is operated in a lean-burn mode, it is necessary to reduce the NOx occluded in the NOx catalyst 3 before the NOx occlusion capacity of the NOx catalyst 3 is saturated.

Accordingly, in this embodiment, provision is made for a fuel addition valve 6 that serves to add a reducing agent in the form of fuel (light oil) to the exhaust gas passing through a portion of the exhaust passage 2 upstream of the NOx catalyst 3. Here, note that the fuel addition valve 6 is driven to open for fuel injection by means of a signal from the ECU 7 to be described later. The fuel injected from the fuel addition valve 6 into the exhaust passage 2 serves to decrease the oxygen concentration of the exhaust gas flowing from an upstream side of the exhaust passage 2, and at the same time to reduce the NOx occluded in the NOx catalyst 3.

Moreover, the fuel thus injected is used to raise the temperature of the NOx catalyst 3 during recovery from the sulfur poisoning thereof in which sulfur components occluded in the NOx catalyst 3 are released. That is, the fuel reacts with certain substances in the NOx catalyst 3 to generate heat at this time, so that the temperature of the NOx catalyst 3 is caused to rise under the action of this heat. Thus, by raising the temperature of the NOx catalyst 3 and thereafter decreasing the air fuel ratio of the incoming exhaust gas, it becomes possible to recover the NOx catalyst 3 from its sulfur poisoning.

Here, reference will be made to the catalyst rich control that is performed at the time of the recovery of the NOx catalyst 3 from its sulfur poisoning. Such catalyst rich control is performed by intermittently injecting fuel from the fuel addition valve 6.

Here, FIGS. 2A and 2B are timing charts showing the waveform of a command signal sent from the ECU 7 to the fuel addition valve 6 and a change in the air fuel ratio of a mixture corresponding to the waveform, respectively, on the same time axis. The fuel addition valve 6 is opened to add or inject fuel when a command signal shown in FIG. 2A is in an on state ("ON"). By adding the fuel to the exhaust gas flowing into the NOx catalyst 3 in this manner, the concentration of the fuel therein becomes high (a rich spike is formed). Here, the amount of change of the fuel concentration (see FIG. 2B) becomes larger in accordance with the increasing period of fuel addition (see FIG. 2A), and the period of formation of a rich spike (see FIG. 2B) also becomes longer in accordance with the increasing total period of fuel addition (see FIG. 2A)(i.e., in accordance with the increasing number of fuel additions). Further, the fuel concentration of the exhaust gas becomes higher to increase the amount of rise in the temperature of the NOx catalyst 3 in accordance with the shortening or decreasing interval of fuel addition (see FIG. 2A). On the other hand, the length of an idle or stop period of fuel addition (see FIG. 2A) corresponds to the length of the duration for which a lean atmosphere continues between rich spikes successively formed, that is, the duration (see FIG. 2B) for which the fuel concentration becomes lower. The bed temperature of the NOx catalyst 3 can be adjusted according to the length of this idle period. That is, the temperature of the NOx catalyst 3 becomes lower in accordance with the increasing idle period.

Here, note that the fuel addition valve 6 in this embodiment corresponds to an exhaust air fuel ratio control device in the present invention.

An electronic control unit (ECU) 7 for controlling the internal combustion engine 1 is provided in conjunction with the engine 1 as constructed in the above-described manner. This ECU 7 serves to control the operating state of the engine 1 in accordance with the operating condition thereof and the driver's requirements.

A variety of kinds of sensors such as ones mentioned above are connected to the ECU 7 through electric wiring, so that the output signals of the various sensors are input to the ECU 7.

Also, the fuel injection valve 6 is connected to the ECU 7 through electric wiring so that it can be controlled by the ECU 7.

Here, note that the air fuel ratio sensor 5, when its temperature is low, will cause a rich shift because of the fast diffusion speed of $H_2$ generated, and this rich shift becomes remarkable if sulfur is not occluded in the NOx catalyst 3. In addition, it is known that though unburnt HC comes to pass through the NOx catalyst 3 when the amount of sulfur poisoning of the NOx catalyst 3 increases, unburnt HC of large particles, which can not pass through the diffusion layer of the air fuel ratio sensor 5, can not be detected by the air fuel ratio sensor 5, so the air fuel ratio sensor 5 is caused to shift to a lean side.

Thus, if learning control is performed based on the output value of the air fuel ratio sensor 5 when the output value of the air fuel ratio sensor 5 is shifted or deviated from the actual value of the air fuel ratio, it becomes difficult to make the air fuel ratio of the exhaust gas close to the target air fuel ratio in an accurate manner in a subsequent air fuel ratio control operation. Specifically, if the learning control is carried out when the air fuel ratio sensor 5 causes a rich shift, the actual air fuel ratio is corrected to a lean side, thus making it difficult to perform sulfur poisoning recovery processing. On the other hand, if the learning control is carried out when the air fuel ratio sensor 5 causes a lean shift, the actual air fuel ratio is corrected to a rich side, so that the amount of HC passing through the NOx catalyst 3 increases, thus giving rise to a fear that white smoke might be generated.

In this respect, according to this embodiment, when the air fuel ratio sensor 5 causes a lean shift or a rich shift, the learning control of the air fuel ratio is inhibited, and a determination as to whether a lean shift or a rich shift is caused by the air fuel ratio sensor 5 is made based on the exhaust gas temperature detected by the exhaust gas temperature sensor 4.

Here, note that though there is a difference between the target bed temperature of the NOx catalyst 3 and the temperature detected by the exhaust gas temperature sensor 4 during the sulfur poisoning recovery processing, this difference becomes substantially a constant value. For example, the exhaust gas temperature detected by the exhaust gas temperature sensor 4 becomes 600° C. with respect to a target bed temperature of 650° C., thus resulting in a difference therebetween of 50° C.

A lean shift or rich shift of the air fuel ratio sensor 5 is determined by the amount of change of the difference (hereinafter referred to as a difference ΔTHC) between this target bed temperature and the exhaust gas temperature detected by the exhaust gas temperature sensor 4.

For example, when the air fuel ratio sensor 5 causes a lean shift, the amount of fuel added from the fuel addition valve 6 is increased through feedback correction. However, since the actual air fuel ratio does not shift to a lean side, the amount of fuel reacting in the NOx catalyst 3 increases, so the exhaust gas temperature detected by the exhaust gas temperature sensor 4 rises. In this case, the difference ΔTHC becomes small. Accordingly, in this embodiment, assuming that the detection value of the air fuel ratio sensor 5 shifts or deviates to a lean side when the difference ΔTHC becomes below a prescribed threshold, the update of the learning value in the learning control on the air fuel ratio is inhibited. In other words, the learning value is updated only at the time when the difference ΔTHC is greater than the threshold.

On the other hand, when the detection value of the air fuel ratio sensor 5 shifts or deviates to a rich side, the result is reversed. Specifically, in this case, the amount of fuel added from the fuel addition valve 6 is reduced through feedback correction, but since the actual air fuel ratio does not shift or deviate to a rich side, the amount of fuel reacting in the NOx catalyst 3 decreases so the exhaust gas temperature detected by the exhaust gas temperature sensor 4 accordingly decreases. In this case, the difference ΔTHC becomes large. Accordingly, in this embodiment, assuming that the detected value of the air fuel ratio sensor 5 shifts or deviates to a rich side when the difference ΔTHC becomes greater than or equal to the threshold, the update of the learning value in the learning control on the air fuel ratio is inhibited. In other words, the learning value is updated only at the time when the difference ΔTHC is smaller than the threshold.

Here, note that the calculation of the air fuel ratio learning value is carried out based on the air fuel ratio detected by the air fuel ratio sensor 5 at the end of "the period of formation of a rich spike", as shown in FIG. 2B.

Now, reference will be made to the flow of operation to make a determination as to whether the update of the learning value is permitted according to this embodiment.

Figure 3:
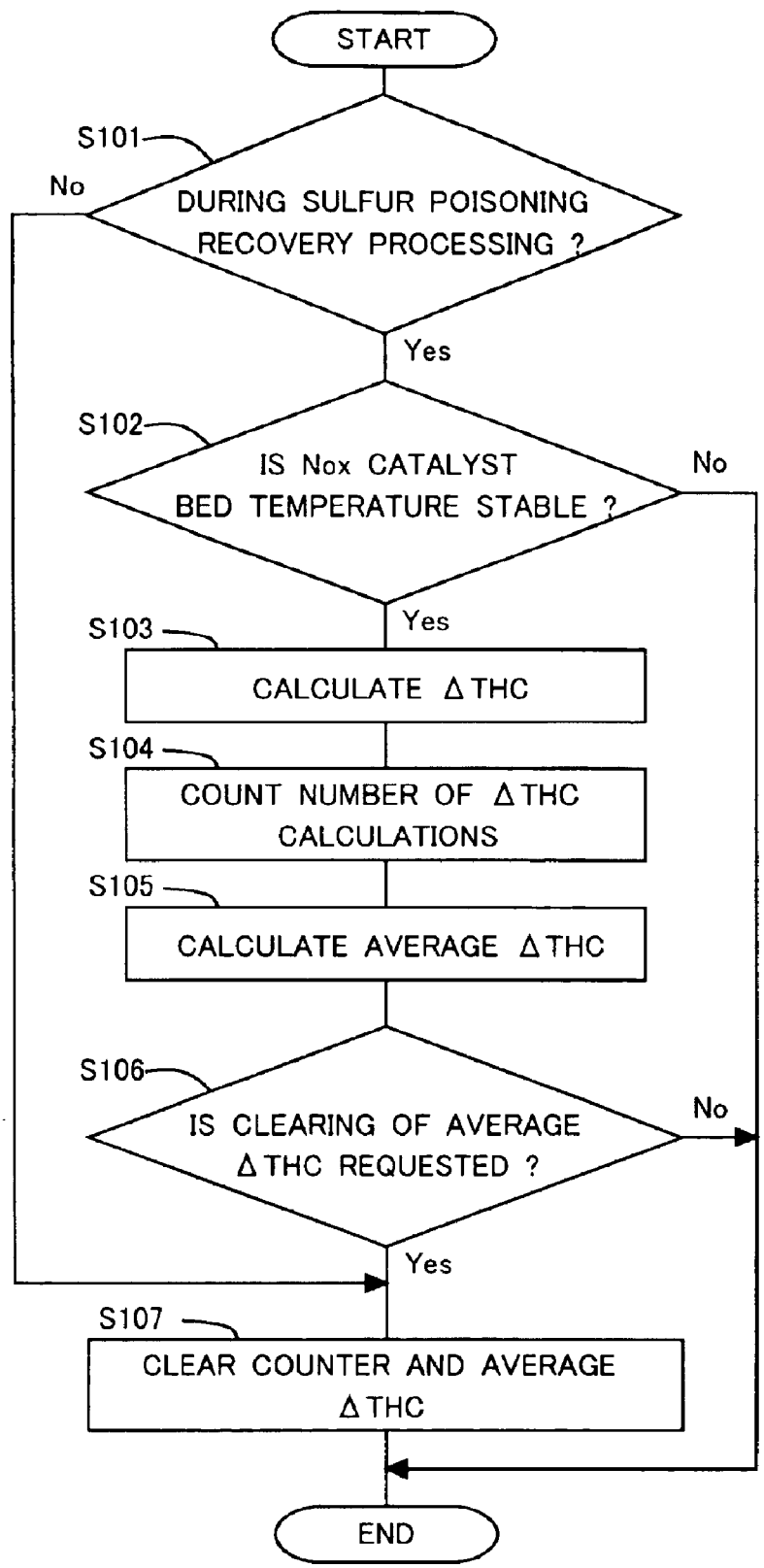
FIG. 3 is a flow chart showing the flow of operation to calculate a difference $\Delta$THC according to a first embodiment of the present invention.

FIG. 3 is a flow chart that shows the flow of operation to calculate the difference ΔTHC according to this embodiment.

In step S101, it is determined whether SOx poisoning recovery processing is being carried out.

When an affirmative determination is made in step S101, the control flow proceeds to step S102, whereas when a negative determination is made in step S101, the control flow proceeds to step S107.

In step S102, it is determined whether the bed temperature of the NOx catalyst 3 is stable. For example, such a determination can be made by determining whether the exhaust gas temperature obtained by the exhaust gas temperature sensor 4 is within a specified range.

When an affirmative determination is made in step S102, the control flow proceeds to step S103, whereas when a negative determination is made in step S102, the control flow is ended.

In step S103, the difference ΔTHC is calculated. In other words, a value calculated by subtracting the exhaust gas temperature obtained by the exhaust gas temperature sensor 4 from the target bed temperature of the NOx catalyst 3 is substituted for the difference ΔTHC.

In step S104, "1" is added to a counter N, which serves to count the frequency or number of calculations of the difference ΔTHC. That is, the processing of N=N+1 is carried out.

In step S105, an averaged ΔTHC, which is an average value of the difference ΔTHC, is calculated. The average of ΔTHC is obtained by the following expression.

Averaged ΔTHC=(the last averaged value ΔTHC×(N−1)+the difference ΔTHC)/N

In step S106, it is determined whether there is a clear request for the averaged ΔTHC. Here, note that the clear request is a request issued in step S202 to be described later. This clear request is issued, for example, when the counter N becomes equal to 10 (N=10).

When an affirmative determination is made in step S106, the control flow proceeds to step S107, whereas when a negative determination is made in step S106, the control flow is ended.

In step S107, the counter N and the averaged ΔTHC are cleared.

In this manner, the averaged ΔTHC can be calculated.

Figure 4:
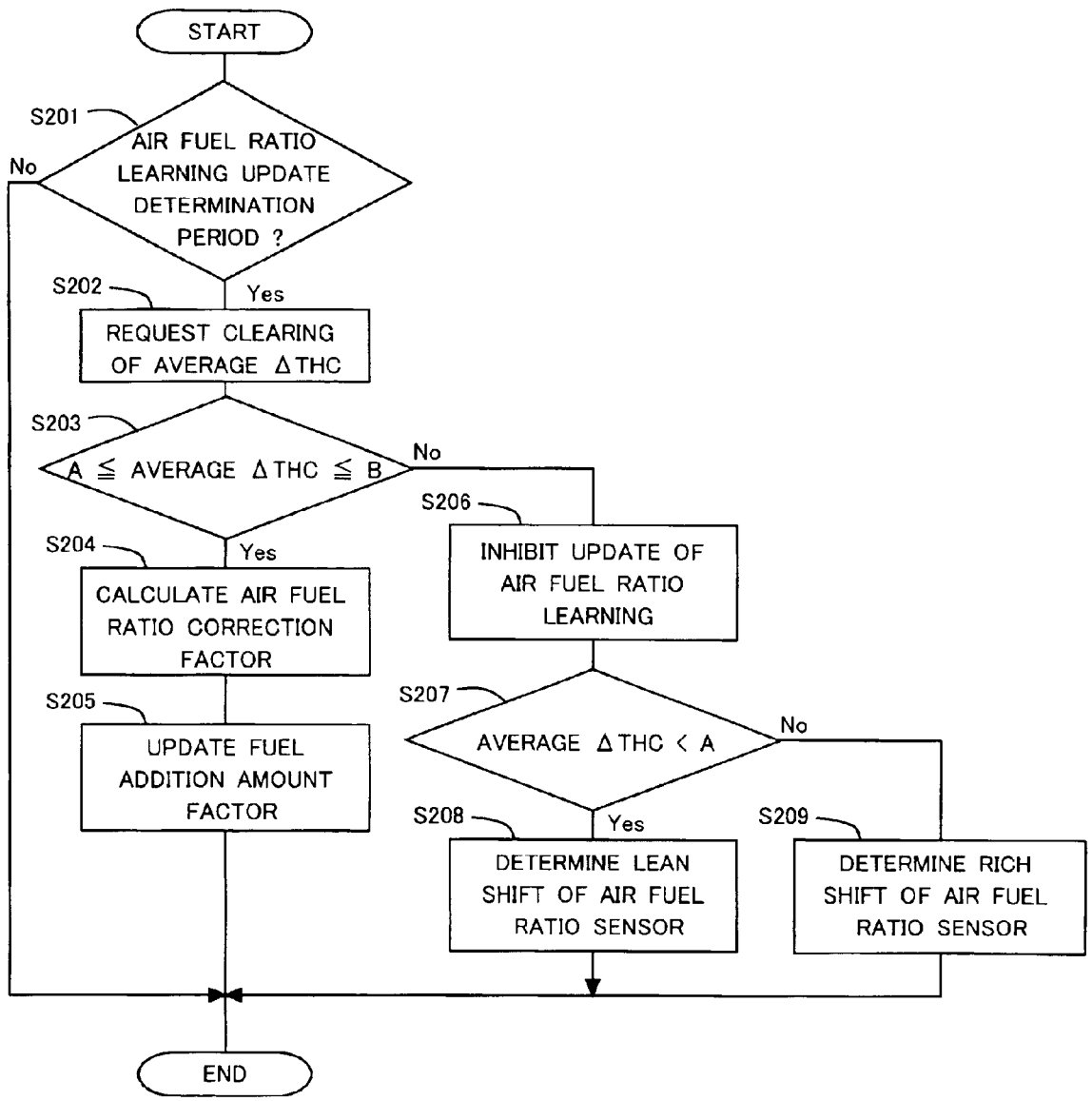
FIG. 4 is a flow chart showing the flow of operation to determine whether the update of a learning value is permitted according to the first embodiment of the present invention.

Next, FIG. 4 is a flow chart that shows the flow of operation to make a determination as to whether the update of the learning value is permitted according to this embodiment.

In step S201, it is determined whether it comes to the time to determine whether the learning of the air fuel ratio is updated. By averaging the difference ΔTHC, it is determined whether an error due to external disturbances has been decreased up to a problem-free range. Here, when the counter N becomes equal to 10 (i.e., N=10), a determination is made that it comes to the time when the learning of the air fuel ratio should be updated.

When an affirmative determination is made in step S201, the control flow proceeds to step S202, whereas when a negative determination is made in step S201, this routine is ended.

In step S202, a clear request for the averaged ΔTHC is issued.

In step S203, it is determined whether the averaged ΔTHC is within a specified range (i.e., greater than or equal to a specified value A and less than or equal to a specified value B). The specified range is set beforehand based on a range within which a rich shift or a lean shift of the air fuel ratio sensor 5 can be permitted.

When an affirmative determination is made in step S203, the control flow proceeds to step S204, whereas when a negative determination is made in step S203, the control flow proceeds to step S206.

In step S204, an air fuel ratio correction factor is calculated by the following expression.

Air fuel ratio correction factor=(target air fuel ratio−ΔA/F)/target air fuel ratio Here, ΔA/F is a difference between an air fuel ratio of a mixture containing a basic air fuel alone without taking account of fuel feedback (hereinafter referred to as "a basic air fuel ratio") and an air fuel ratio of a mixture containing an amount of fuel for feedback correction (hereinafter referred to as "a feedback air fuel ratio"). That is, ΔA/F=(basic air fuel ratio)−(feedback air fuel ratio)

In step S205, a fuel addition amount correction factor is updated.

Here, note that the fuel addition amount correction factor is calculated according to the following relational expression by using a basic amount of fuel to be added (hereinafter referred to as a basic fuel addition amount), which is calculated from the number of revolutions per minute and the load of the internal combustion engine, and a change (i.e., an increase or a decrease) in the amount of fuel to be added (hereinafter referred to as a feedback correction amount) at the time when the amount of fuel to be added is corrected in a feedback manner so as to bring the air fuel ratio detected by the air fuel ratio sensor 5 close to the target air fuel ratio upon adding the basic fuel addition amount to the exhaust gas.

Addition amount correction factor=(basic fuel addition amount+feedback correction amount)/basic fuel addition amount The addition amount correction factor thus calculated is stored, so that an amount of fuel obtained by multiplying the basic fuel addition amount by the fuel addition amount correction factor is added at the time when fuel is added next time. Thus, storing the correction factor obtained from the result of the previous fuel addition and correcting the fuel addition amount based on this correction factor upon addition of fuel next time is called "learning control" in this embodiment. Here, note that in this embodiment the addition amount correction factor is handled as an air fuel ratio learning value.

In step S206, the update of the learning value in the air fuel ratio control is inhibited. That is, updating the fuel addition amount correction factor is inhibited.

In step S207, it is determined whether the averaged ΔTHC is less than the specified value A.

When an affirmative determination is made in step S207, the control flow proceeds to step S208, whereas when a negative determination is made in step S207, the control flow proceeds to step S209.

In step S208, a determination is made that the detected value of the air fuel ratio sensor 5 shifts or deviates to a lean side. In other words, when the averaged ΔTHC is less than the specified value A, it is in the state that an amount of fuel more than necessary is supplied, and hence it is the case that the temperature of the NOx catalyst 3 excessively rises.

In step S209, it is determined that the detected value of the air fuel ratio sensor 5 shifts or deviates to a rich side. In other words, it is the case that the averaged ΔTHC is greater than the specified value B, and hence it is in the state that the amount of fuel supplied is insufficient. This is the case that the temperature of the NOx catalyst 3 does not rise up to a necessary temperature.

Thus, the learning value in the learning control (the addition amount correction factor) can be updated only when the shift or deviation of the detection value of the air fuel ratio sensor 5 from the actual air fuel ratio is in the permissible range. As a result, the accuracy of the learning control can be improved.

Here, note that the function of the ECU 7 to perform the processing in step S203 in this embodiment corresponds to a determination device 73 in the present invention. Also, the function of the ECU 7 to perform the processing in step S206 in this embodiment corresponds to an air fuel ratio learning value update inhibition device 74 in the present invention. In addition, the function of the ECU 7 to perform the processing in step S204 in this embodiment corresponds to an air fuel ratio feedback value calculation device 71 in the present invention, and the function of the ECU 7 to perform the processing in step S205 in this embodiment corresponds to an air fuel ratio learning value calculation device 72 in the present invention.

Embodiment 2

Figure 16:
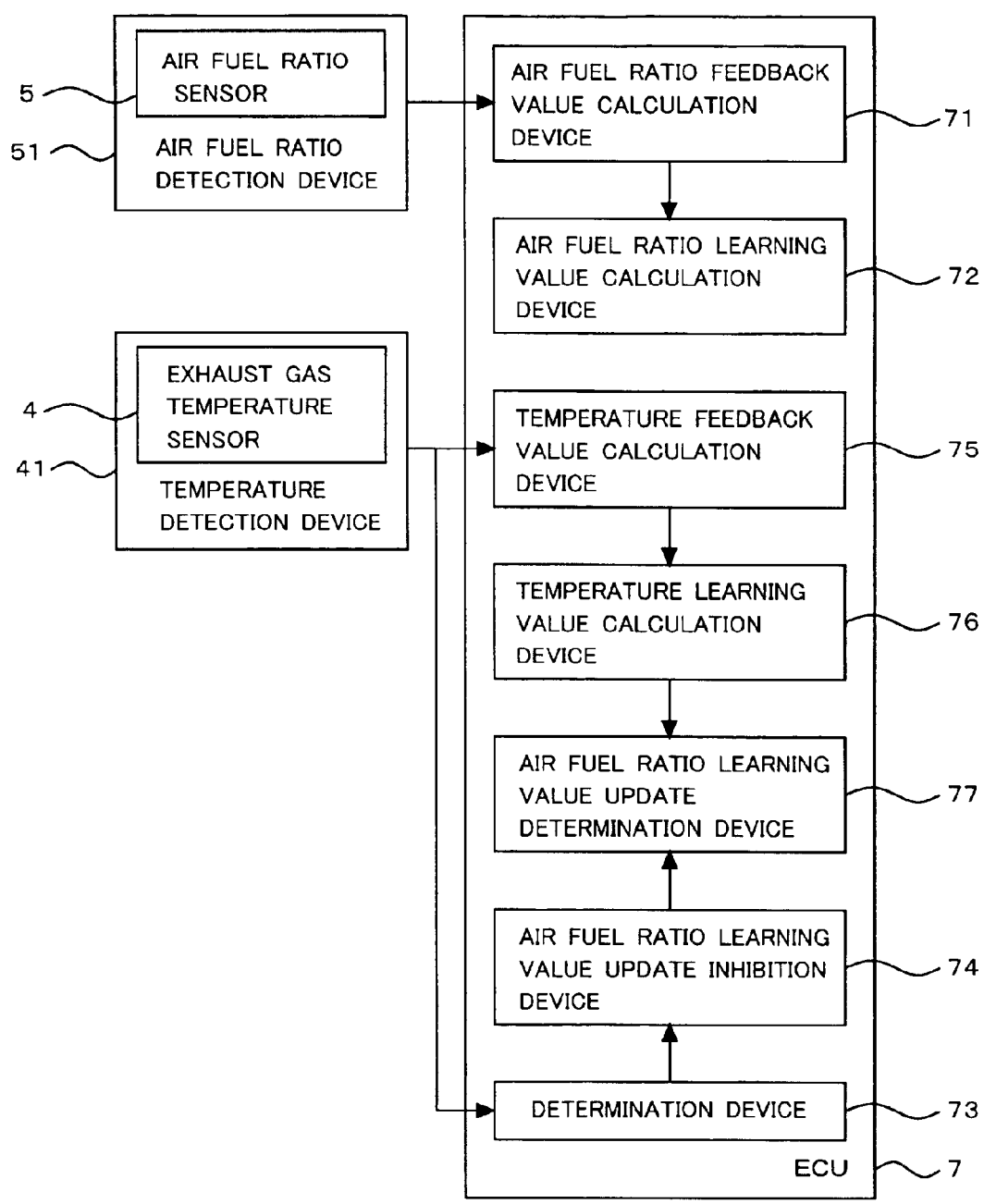
FIG. 16 is a block diagram showing the relation between component elements according to the second embodiment of the present invention.

In this second embodiment, the basic structure of the hardware, to which the present invention is applied, are common with that of the above-mentioned first embodiment, and hence an explanation thereof is omitted. Here, note that FIG. 16 is a block diagram that shows the relation between component elements in this second embodiment.

As described in the first embodiment, if a determination as to whether the air fuel ratio learning value is to be updated is made based on the detected value of the exhaust gas temperature sensor 4, the learning of the air fuel ratio becomes unable to be done in time, so the NOx catalyst 3 might be overheated before the air fuel ratio learning value is updated.

Accordingly, in this embodiment, the history of the change of the temperature learning value is used for update determination in the air fuel ratio learning control, and if the air fuel ratio learning value can be updated, the temperature learning value is returned to its unupdated state, so that the bed temperature of the NOx catalyst 3 is prevented from being changed due to the update of the air fuel ratio learning value. Thus, an excessive correction of the amount of fuel to be supplied due to the updating of both the air fuel ratio learning value and the temperature learning value can be suppressed by returning the temperature learning value to its unupdated state.

Here, the bed temperature of the NOx catalyst 3 can be estimated by obtaining the amount of heat generated from the amount of fuel added. Hereinafter, the bed temperature of the NOx catalyst 3 thus estimated is called an estimated bed temperature. In addition, the bed temperature of the NOx catalyst 3 is adjusted to the target bed temperature necessary for the sulfur poisoning recovery process, and in this embodiment, the amount of fuel to be added or the idle or stop period of fuel addition is controlled in such a manner that the estimated bed temperature becomes the target bed temperature. Since, however, the estimated bed temperature is obtained through calculation, a difference between the estimated bed temperature and the actual bed temperature might be generated due to some factors or causes that are not includes in the calculation process. As a result, it becomes difficult to make the temperature of the NOx catalyst 3 become the target bed temperature.

Accordingly, the feedback control (hereinafter referred to as temperature feedback control) and the learning control (hereinafter referred to as temperature learning control) to bring the temperature of the NOx catalyst 3 close to the target temperature are carried out during the sulfur poisoning recovery process of the NOx catalyst 3.

The temperature feedback control is the control to bring the estimated bed temperature close to the actual bed temperature. In this control, the bed temperature of the NOx catalyst 3 is calculated based on the exhaust gas temperature detected by the exhaust gas temperature sensor 4, and the value of the estimated bed temperature is corrected so as to approach the bed temperature thus obtained. Here, note that the function of the ECU 7 to calculate the correction value at the time of temperature feedback control in this embodiment corresponds to a temperature feedback value calculation device 75 in the present invention.

In addition, the temperature learning control is the control to bring the estimated bed temperature close to the target bed temperature. In this control, the amount of generated heat needed to eliminate the difference between the target bed temperature and the estimated bed temperature, i.e., the value to correct the amount of added fuel or the idle period of fuel addition, is stored as a learning value, and when fuel is added next time, the addition of fuel is carried out based on the amount of added fuel or the idle period of fuel addition reflecting this learning value. Here, note that the function of the ECU 7 to perform the calculation of the learning value in the temperature learning control in this embodiment corresponds to a temperature learning value calculation device 76 in the present invention.

Thus, the actual bed temperature of the NOx catalyst 3 can be brought close to the target bed temperature according to the temperature feedback control and the temperature learning control.

Here, note that the temperature feedback control may be the control in which the amount of added fuel or the idle period of fuel addition needed to make the bed temperature of the NOx catalyst 3 become the target bed temperature is controlled in a feedback manner based on the temperature of the exhaust gas obtained by the exhaust gas temperature sensor 4, so as to correct the amount of added fuel or the idle or stop period of fuel addition based on this feedback value. In this case, the temperature learning control stores the value to correct the amount of added fuel or the idle period of fuel addition, and performs fuel addition by controlling the amount of added fuel or the idle or stop period of fuel addition based on the value thus stored at the time when fuel is added next time.

Here, "the amount of added fuel" can be adjusted by changing the period of fuel addition, the interval of fuel addition, and the total period of fuel addition in FIG. 2. Also, "the idle or stop period of fuel addition" can be adjusted by changing the idle period in FIG. 2.

FIG. 5 is a view that shows the relation among the temperature learning value, the air fuel ratio learning value, and the determination result of the air fuel ratio learning value update.

Here, note that a "temperature learning value+side" means the case where the temperature of the exhaust gas is raised, that is, the case where the amount of fuel to be added is increased or the idle period of fuel addition is decreased.

Also, a "temperature learning value−side" means the case where the temperature of the exhaust gas is lowered, that is, the case where the amount of fuel to be added is decreased or the idle period of fuel addition is increased.

In addition, a "correction factor increase request" means the case where the air fuel ratio of the exhaust gas is corrected toward a rich side, that is, the case where the amount of fuel to be added is increased or the idle period of fuel addition is decreased.

Moreover, a "correction factor decrease request" means the case where the air fuel ratio of the exhaust gas is corrected toward a lean side, that is, the case where the amount of fuel to be added is decreased or the idle period of fuel addition is increased.

Further, "air fuel ratio learning value update permission" indicates the case where the learning value of the air fuel ratio is updated, whereas "updating inhibition" indicates the case where the learning value of the air fuel ratio is not updated. Also, "addition amount shortage" indicates the case where the amount of fuel to be added is small or the idle period of fuel addition is long, whereas "addition amount excess" indicates the case where the amount of fuel to be added is excessive or the idle period of fuel addition is short. Additionally, "sensor's lean shift" indicates that the detected value of the air fuel ratio sensor 5 shifts or deviates to a lean side, whereas "sensor's rich shift" indicates that the detected value of the air fuel ratio sensor 5 shifts or deviates to a rich side.

Now, reference will be made to the flow of operation to make a determination as to whether the update of the learning value is permitted according to this embodiment, while referring to FIG. 5.

Figure 6:
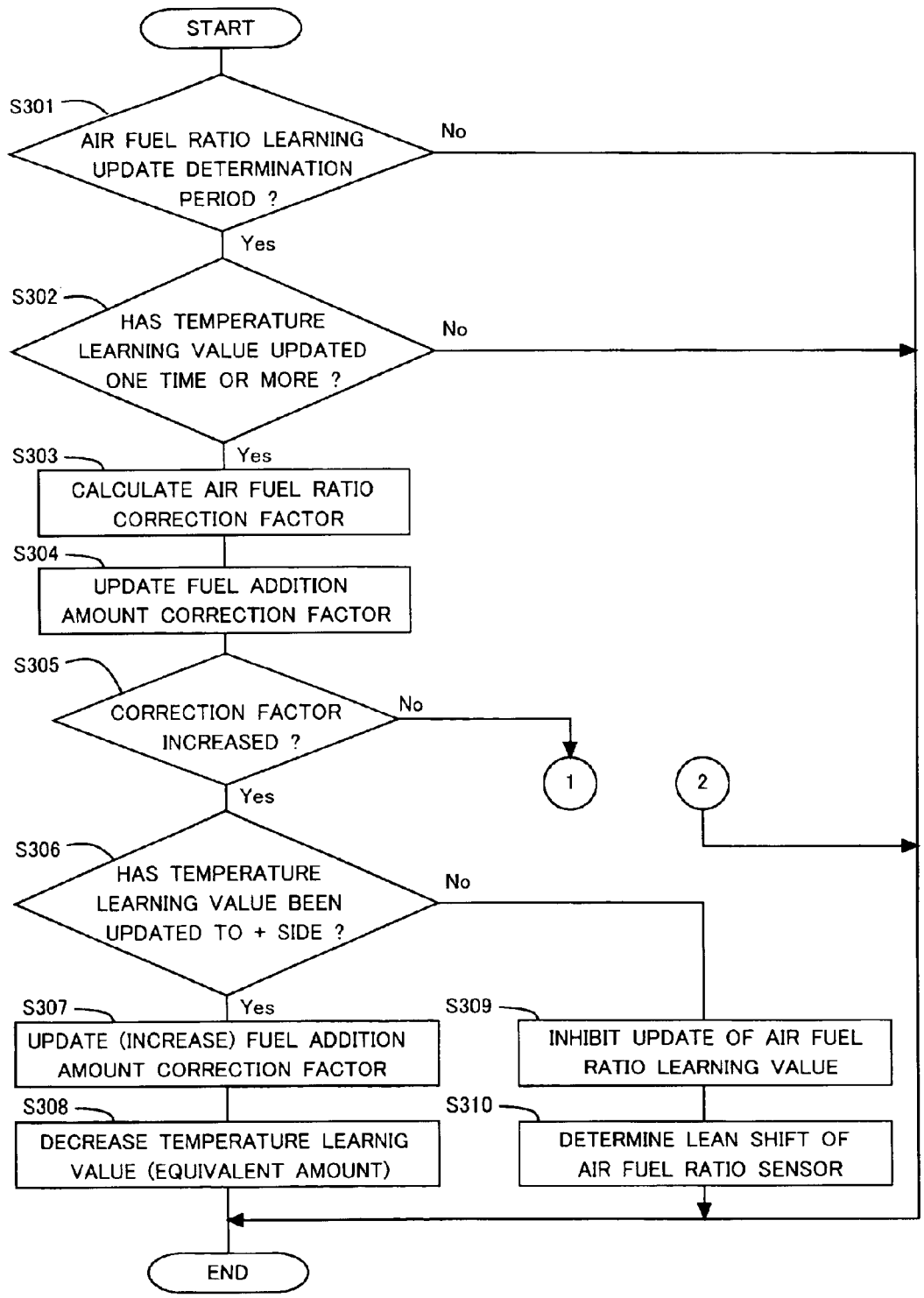
FIG. 6 is a flow chart showing the first half of the flow of operation to determine whether the update of a learning value is permitted according to a second embodiment of the present invention.
Figure 7:
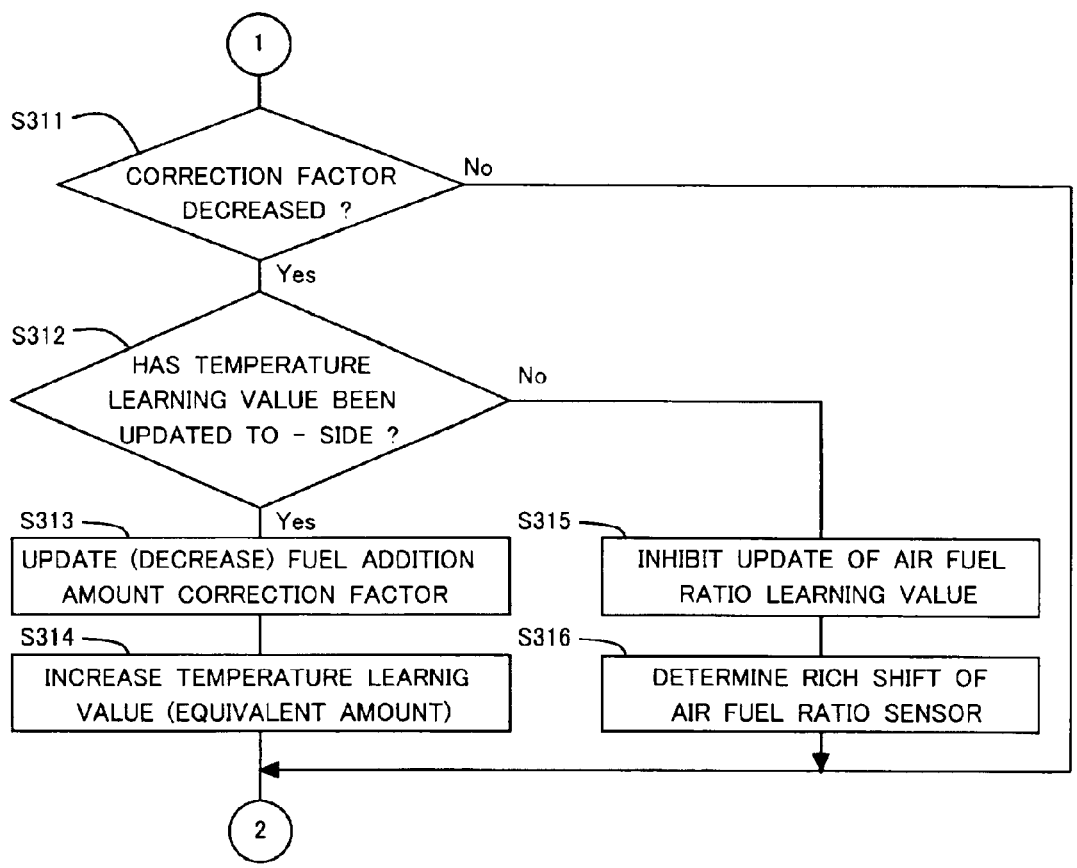
FIG. 7 is a flow chart showing the second half of the flow of operation to determine whether the update of a learning value is permitted according to the second embodiment of the present invention.

FIGS. 6 and 7 are flow charts that show the flow of operation to make a determination as to whether the update of the learning value is permitted according to this second embodiment.

In step S301, it is determined whether it comes to the time to determine whether the learning of the air fuel ratio is updated. Here, the processing similar to that in the aforementioned step S201 is performed.

When an affirmative determination is made in step S301, the control flow proceeds to step S302, whereas when a negative determination is made in step S301, this routine is ended.

In step S302, it is determined whether the temperature learning value has been updated one time or more.

When an affirmative determination is made in step S302, the control flow proceeds to step S303, whereas when a negative determination is made in step S302, the control flow is ended.

In step S303, an air fuel ratio correction factor is calculated according to the processing similar to that in the aforementioned step S204.

In step S304, a fuel addition amount correction factor is updated. Here, the processing similar to that in step S205 is performed.

In step S305, it is determined whether the addition amount correction factor has been increased due to the processing of step S304.

When an affirmative determination is made in step S305, the control flow proceeds to step S306, whereas when a negative determination is made in step S305, the control flow proceeds to step S311.

In step S306, it is determined whether the temperature learning value has been updated to a plus (+) side. That is, it is determined whether the temperature learning value has been updated so as to increase the amount of fuel to be added or decrease the fuel addition idle period.

When an affirmative determination is made in step S306, the control flow proceeds to step S307, whereas when a negative determination is made in step S306, the control flow proceeds to step S309.

In step S307, the fuel addition amount correction factor is updated. In this case, the amount of fuel to be added is increased or the fuel addition idle period is decreased.

In step S308, the temperature learning value is decreased to be returned to its unupdated state. That is, the amount of fuel to be added is decreased or the fuel addition idle period is increased. As a result, the temperature learning value and the fuel addition amount correction factor (the air fuel ratio learning value) are updated to increase at the same time can be suppressed, whereby excessive fuel can be suppressed, thus making it possible to prevent overheating of the NOx catalyst 3.

In step S309, the update of the air fuel ratio learning value or the fuel addition amount correction factor is inhibited.

In step S310, a determination is made that the air fuel ratio sensor 5 causes a lean shift.

In step S311, it is determined whether the addition amount correction factor has been decreased due to the processing in step S304.

When an affirmative determination is made in step S311, the control flow proceeds to step S312, whereas when a negative determination is made in step S311, this routine is ended.

In step S312, it is determined whether the temperature learning value has been updated to a minus (−) side. That is, it is determined whether the temperature learning value has been updated so as to decrease the amount of fuel to be added or increase the fuel addition idle period.

When an affirmative determination is made in step S312, the control flow proceeds to step S313, whereas when a negative determination is made in step S312, the control flow proceeds to step S315.

In step S313, the fuel addition amount correction factor is updated. In this case, the amount of fuel to be added is decreased or the fuel addition idle period is increased.

In step S314, the temperature learning value is increased so as to be returned to its unupdated state. That is, the amount of fuel to be added is increased or the fuel addition idle period is decreased. As a result, the temperature learning value and the addition amount correction factor (the air fuel ratio learning value) are updated to decrease at the same time can be suppressed, thereby making it possible to suppress fuel shortage.

In step S315, the update of the air fuel ratio learning value or the fuel addition amount correction factor is inhibited.

In step S316, it is determined that the air fuel ratio sensor 5 causes a rich shift.

In this manner, the addition amount correction factor can be updated while preventing the bed temperature of the NOx catalyst 3 from being changed due to the updating of the air fuel ratio learning value, i.e., suppressing overheating of the NOx catalyst 3. In addition, it is possible to determine whether the air fuel ratio sensor 5 causes a lean shift or a rich shift.

Here, note that the fuel addition valve 6 in this embodiment corresponds to a fuel supply device or an exhaust air fuel ratio control device in the present invention. Also, the function of the ECU 7 to perform the processes in steps S305, S306, S311 and S312 in this embodiment corresponds to an air fuel ratio learning value update determination device 77 in the present invention. Further, the function of the ECU 7 to perform the processes in steps S306 and S312 in this embodiment corresponds to a determination device 73 in the present invention, and the function of the ECU 7 to perform the processes in steps S309 and S315 in this embodiment corresponds to an air fuel ratio learning value update inhibition device 74 in the present invention.

Embodiment 3

In this third embodiment, the basic structure of the hardware, to which the present invention is applied, is common with that of the above-mentioned first embodiment, and hence an explanation thereof is omitted.

However, in cases where the air fuel ratio learning is carried out by means of the fuel addition amount correction factor obtained from the period of formation of one rich spike during sulfur poisoning recovery processing, even if the air fuel ratio is changed by chance due to some factors or causes, the fuel addition amount correction factor would be updated and the amount of fuel to be added would be accordingly corrected. To cope with such a situation, reliability in the air fuel ratio learning control has been improved by updating the fuel addition amount correction factor after gradually changing the fuel addition amount correction factor for the period of formation of 20 rich spikes for example. However, if the addition amount correction factor is updated during calculation of the temperature learning value, the bed temperature of the NOx catalyst 3 will be changed, thus making it difficult to perform accurate temperature learning. For example, performing the process of gradually changing the fuel addition amount correction factor occasionally makes it impossible to determine when the lean shift or the rich shift of the air fuel ratio sensor 5 occurred.

Accordingly, in this embodiment, an average value of the fuel addition amount correction factor for a specified period is calculated, and updating the fuel addition amount correction factor is inhibited for this specified period. In addition, by making a comparison between the last calculated average of the fuel addition amount correction factor and the currently calculated average of the addition amount correction factor, it is determined whether the air fuel ratio sensor 5 causes a lean shift or a rich shift.

Figure 8:
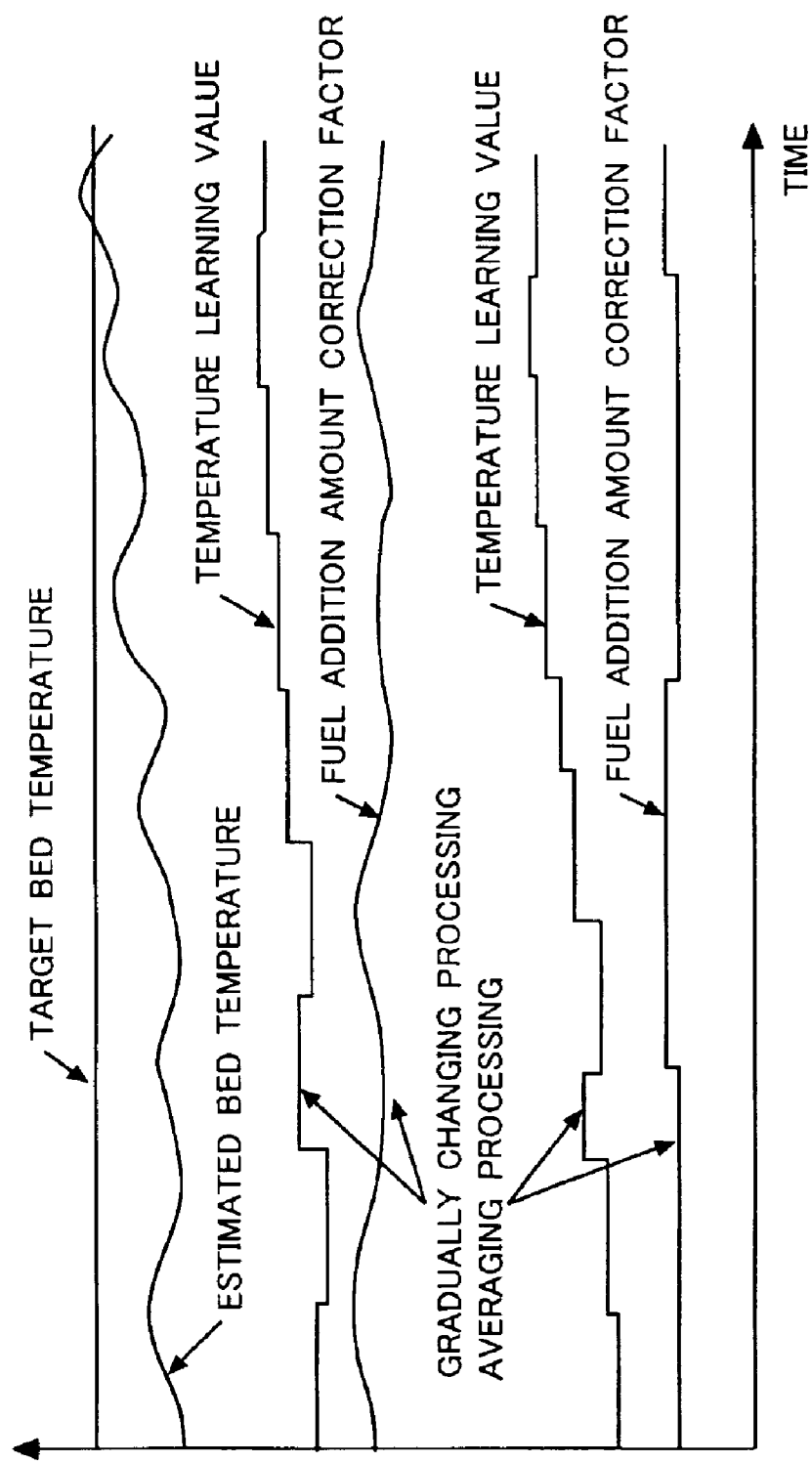
FIG. 8 is a timing chart showing the time course of a target bed temperature, an estimated bed temperature, a temperature learning value, and a fuel addition amount correction factor (air fuel ratio learning value) of an NOx catalyst.

Here, FIG. 8 is a timing chart that illustrates the time course of the target bed temperature, the estimated bed temperature, the temperature learning value of the NOx catalyst 3 as well as the fuel addition amount correction factor (the air fuel ratio learning value). The temperature learning value and the fuel addition amount correction factor are shown in cases when a gradually changing process is performed and when an averaging process according to this embodiment is performed, respectively.

The average value of the fuel addition amount correction factor (hereinafter referred to as an average fuel addition amount correction factor) according to this embodiment is obtained by the following expression.

Average fuel addition amount correction factor=(the last average learning value×(N−1)+instantaneous addition amount correction factor)/N Here, N is set as 10 for instance. That is, the specified period in which updating the fuel addition amount correction factor is inhibited is a period for which N becomes equal to 10 (N=10). In addition, the fuel addition amount correction factor may be the air fuel ratio learning value.

In this manner, updating the fuel addition amount correction factor is inhibited until the time when N becomes equal to 10 (N=10). Since the fuel addition amount correction factor becomes a constant or fixed value, by calculating the temperature learning value during this period, it is possible to obtain the temperature learning value, which is not subjected to the influence of the addition amount correction factor. In addition, as described in the first and second embodiments, the rich shift or the lean shift of the air fuel ratio sensor 5 can be determined based on a change in the bed temperature of the NOx catalyst 3.

Embodiment 4

In this fourth embodiment, the basic structure of the hardware, to which the present invention is applied, is common with that of the above-mentioned first embodiment, and hence an explanation thereof is omitted.

Here, the feedback of the fuel addition amount is performed even if the air fuel ratio learning value is not updated, so if the air fuel ratio sensor 5 causes a lean shift at the time when the update of the air fuel ratio learning value is inhibited, the amount of fuel to be added is corrected to increase. As a result, there is a fear that white smoke might be generated. Thus, according to this embodiment, when the air fuel ratio sensor 5 causes a lean shift, the correction to increase the amount of fuel to be added according to the feedback of the fuel addition amount is inhibited.

In addition, in case where it is determined that the air fuel ratio sensor 5 causes a rich shift, when the correction to decrease the amount of fuel to be added is inhibited in the same way, there will be the following situation. That is, in this case, if the determination that the air fuel ratio sensor 5 has caused a rich shift is in error, the amount of fuel to be added is not increased though it is actually necessary, thus giving rise a fear that white smoke might be generated. Also, when a rich shift actually takes place, it is not necessary to actually decrease the amount of fuel to be added, and hence there will be no problem even if the correction to decrease the fuel addition amount is inhibited. In this case, sulfur poisoning recovery processing or the like can be carried out continuously. However, in this embodiment, when it is determined that the air fuel ratio sensor 5 causes a rich shift, the suppression of white smoke is give higher priority than the continuation of the sulfur poisoning recovery processing or the like, and the correction to decrease the fuel addition amount is not inhibited.

Now, reference will be made to the flow of operation to make a determination as to whether the update of the learning value is permitted according to this fourth embodiment.

Figure 9:
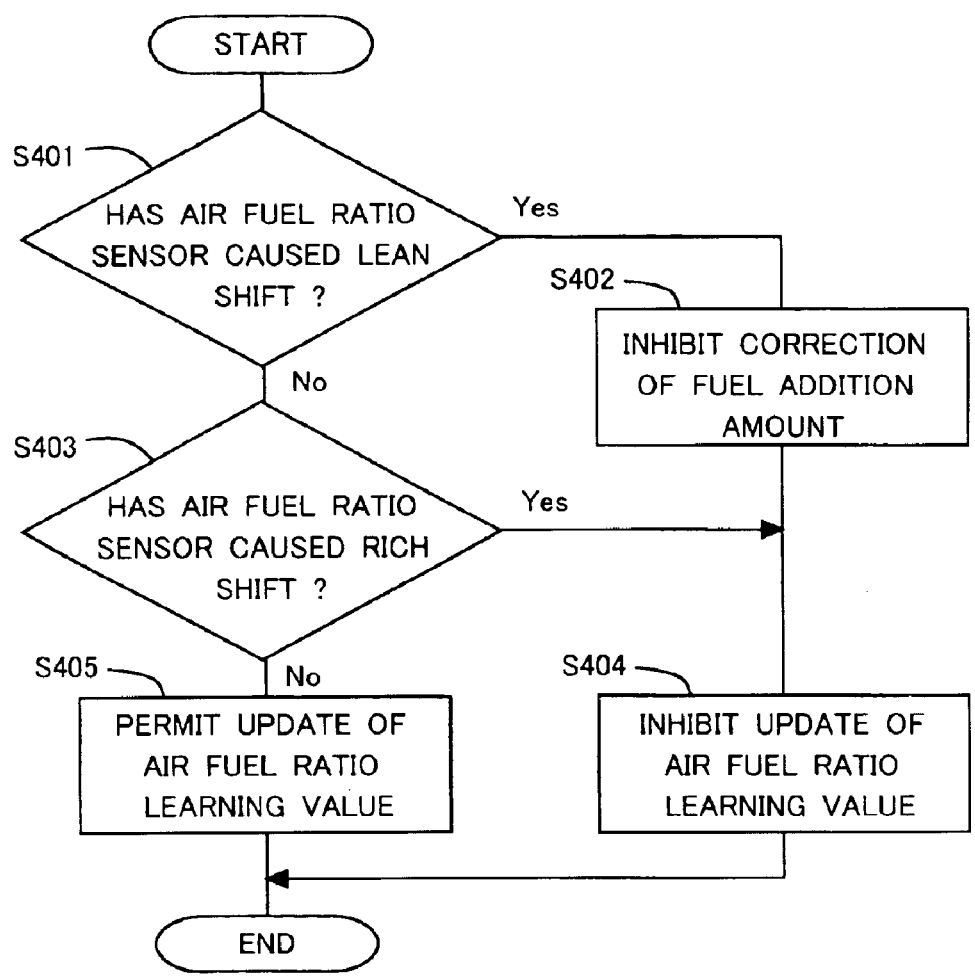
FIG. 9 is a flow chart showing the flow of operation to determine whether the update of a learning value is permitted according to a fourth embodiment of the present invention.

FIG. 9 is a flow chart that illustrates the flow of operation to make a determination as to whether the update of the learning value is permitted according to this fourth embodiment.

In step S401, it is determined whether the air fuel ratio sensor 5 causes a lean shift. As a method to perform this determination, there is used the method explained in the first embodiment or in the second embodiment.

When an affirmative determination is made in step S401, the control flow proceeds to step S402, whereas when a negative determination is made in step S401, the control flow proceeds to step S403.

In step S402, the correction of the amount of fuel to be added according to feedback control is inhibited.

In step S403, it is determined whether the air fuel ratio sensor 5 causes a rich shift. As a method to perform such a determination, there is used the method explained in the first embodiment or in the second embodiment.

When an affirmative determination is made in step S403, the control flow proceeds to step S404, whereas when a negative determination is made in step S403, the control flow proceeds to step S405.

In step S404, the update of the air fuel ratio learning value or the fuel addition amount correction factor is inhibited.

In step S405, the update of the air fuel ratio learning value or the fuel addition amount correction factor is permitted.

Thus, when the air fuel ratio sensor 5 causes a lean shift, to increase the amount of fuel to be added is inhibited, whereas when the air fuel ratio sensor 5 causes a rich shift, to increase the amount of fuel to be added is permitted, thereby making it possible to suppress the generation of white smoke due to an excessive addition of fuel.

Here, note that the function of the ECU 7 to perform the processing in step S404 in this embodiment corresponds to an air fuel ratio learning value update inhibition device 74 in the present invention.

Embodiment 5

In this fifth embodiment, the basic structure of the hardware, to which the present invention is applied, is common with that of the above-mentioned first embodiment, and hence an explanation thereof is omitted.

Here, in this fifth embodiment, when it is determined that the air fuel ratio sensor 5 causes a rich shift or a lean shift, the target value of the air fuel ratio detected by the air fuel ratio sensor 5 (hereinafter referred to as the target air fuel ratio) is changed in accordance with the rich shift or the lean shift of the air fuel ratio sensor 5. Additionally, at this time, the update of the air fuel ratio learning value or the fuel addition amount correction factor is inhibited. In this regard, if a determination can be made as to how much the rich or lean shift of the air fuel ratio sensor 5 is, the target air fuel ratio can be corrected so as to eliminate this shift, but if such a determination is impossible, the target air fuel ratio can be changed by a specified value.

Now, reference will be made to the flow of operation to make a determination as to whether the update of the learning value is permitted according to this fifth embodiment.

Figure 10:
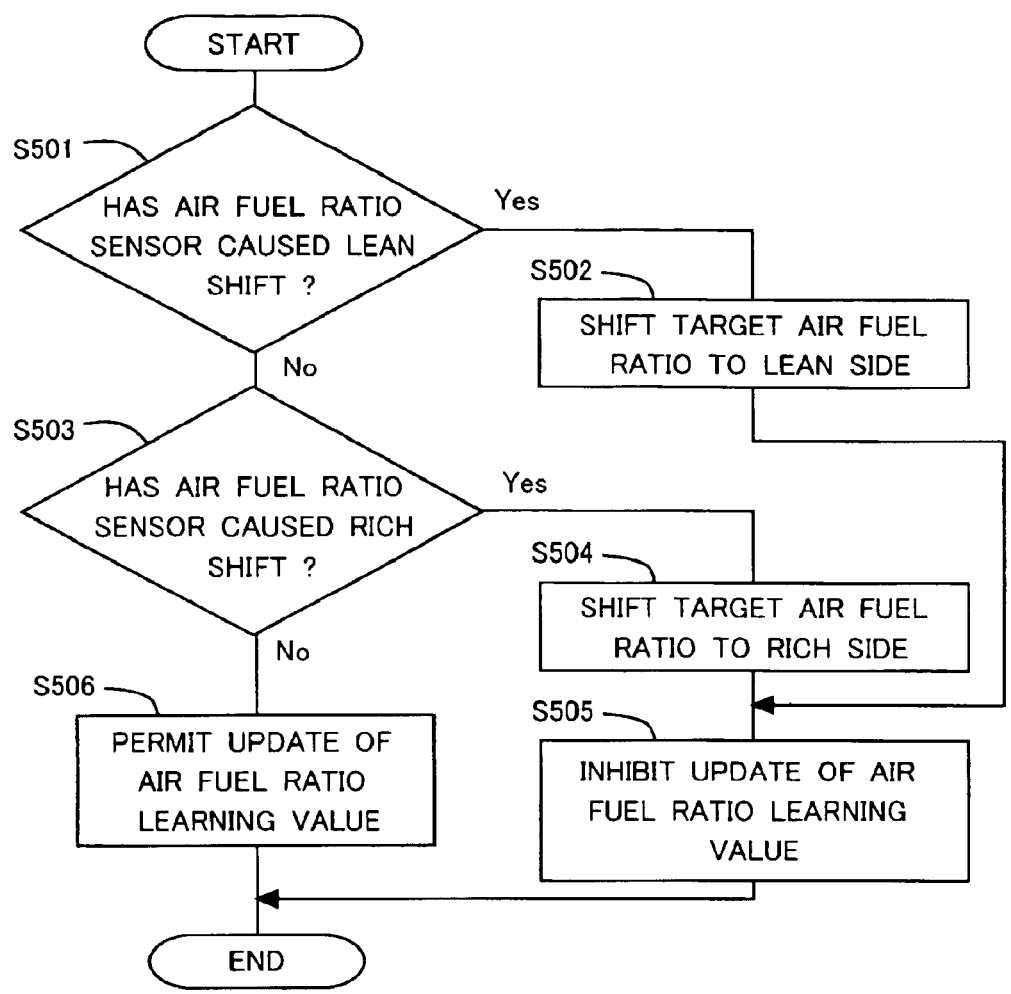
FIG. 10 is a flow chart showing the flow of operation to determine whether the update of a learning value is permitted according to a fifth embodiment of the present invention.

FIG. 10 is a flow chart that illustrates the flow of operation to make a determination as to whether the update of the learning value is permitted according to this fifth embodiment.

In step S501, it is determined whether the air fuel ratio sensor 5 causes a lean shift. As a method to perform such a determination, there is used the method explained in the first embodiment or in the second embodiment.

When an affirmative determination is made in step S501, the control flow proceeds to step S502, whereas when a negative determination is made in step S501, the control flow proceeds to step S503.

In step S502, the target air fuel ratio is made to shift to a lean side.

In step S503, it is determined whether the air fuel ratio sensor 5 causes a rich shift. As a method to perform such a determination, there is used the method explained in the first embodiment or in the second embodiment.

When an affirmative determination is made in step S503, the control flow proceeds to step S504, whereas when a negative determination is made in step S503, the control flow proceeds to step S506.

In step S504, the target air fuel ratio is made to shift to a rich side.

In step S505, the update of the air fuel ratio learning value or the fuel addition amount correction factor is inhibited.

In step S506, the update of the air fuel ratio learning value or the fuel addition amount correction factor is permitted.

In this manner, when the air fuel ratio sensor 5 causes a lean shift or a rich shift, by accordingly changing the target air fuel ratio, it is possible to correct the amount of fuel to be added so as to make the air fuel ratio become the one as requested by the NOx catalyst 3, Moreover, when such a lean or rich shift is caused, the mislearning of the fuel addition amount correction factor can be suppressed by inhibiting the update of the air fuel ratio learning value.

Here, note that the function of the ECU 7 to perform the processing in step S505 in this embodiment corresponds to an air fuel ratio learning value update inhibition device 74 in the present invention.

Embodiment 6

In this sixth embodiment, the basic structure of the hardware, to which the present invention is applied, is common with that of the above-mentioned first embodiment, and hence an explanation thereof is omitted.

As the proportion of $H_2$ generated in the NOx catalyst 3 changes in accordance with the bed temperature of the NOx catalyst 3, the air fuel ratio sensor 5 might cause a rich shift at this time. In other words, in the following expression, the balance of equilibrium moves to the right as the bed temperature of the NOx catalyst 3 becomes lower.

$$CO+H_2O \rightleftharpoons CO_2+H_2$$

Accordingly, in this sixth embodiment, when the bed temperature (measured value or estimated value) of the NOx catalyst 3 or the exhaust gas temperature detected by the exhaust gas temperature sensor 4 is lower than or equal to a predetermined value (e.g., 600° C.), the update of the air fuel ratio learning value is inhibited. In this case, the correction to decrease the amount of fuel to be added is not inhibited in order to suppress the generation of white smoke as described in the above-mentioned fourth embodiment, Now, reference will be made to the flow of operation to make a determination as to whether the update of the learning value is permitted according to this sixth embodiment.

Figure 11:
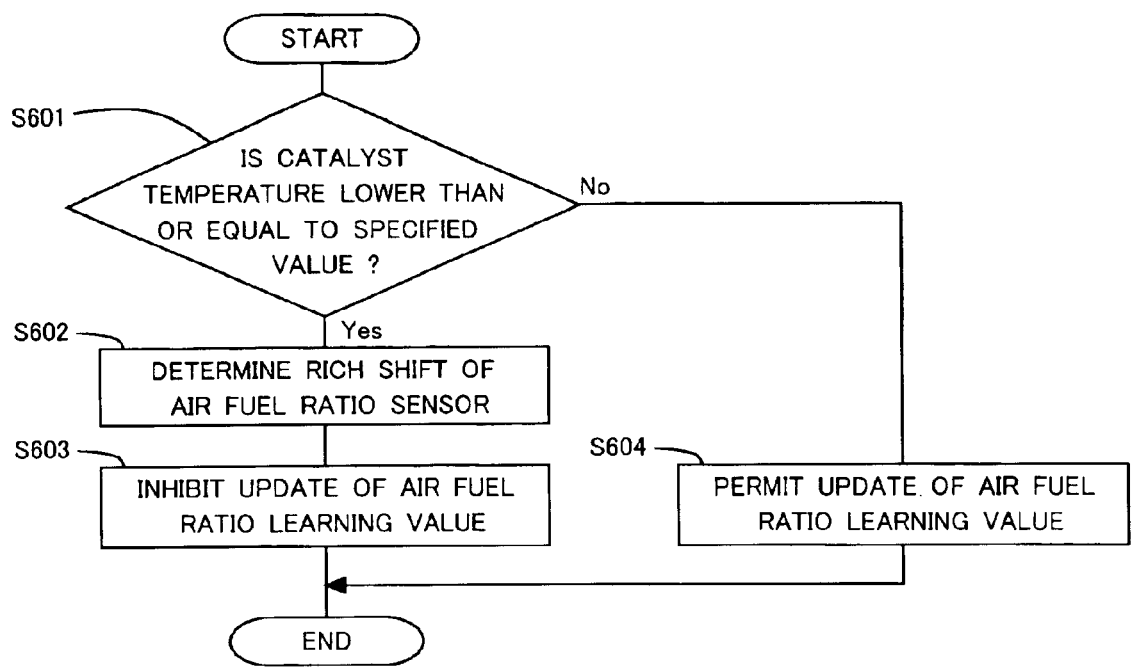
FIG. 11 is a flow chart showing the flow of operation to determine whether the update of a learning value is permitted according to a sixth embodiment of the present invention.

FIG. 11 is a flow chart that illustrates the flow of operation to make a determination as to whether the update of the learning value is permitted according to this sixth embodiment.

In step S601, it is determined whether the bed temperature of the NOx catalyst 3 (measured value or estimated value) or the exhaust gas temperature detected by the exhaust gas temperature sensor 4 is lower than or equal to the predetermined value (e.g., 600° C.). The predetermined value for the exhaust gas temperature is an upper limit of the temperature at which the air fuel ratio sensor 5 may cause a rich shift.

When an affirmative determination is made in step S601, the control flow proceeds to step S602, whereas when a negative determination is made in step S601, the control flow proceeds to step S604.

In step S602, it is determined that the air fuel ratio sensor 5 causes a rich shift.

In step S603, the update of the air fuel ratio learning value or the fuel addition amount correction factor is inhibited.

In step S604, the update of the air fuel ratio learning value or the fuel addition amount correction factor is permitted.

In this manner, when the bed temperature of the NOx catalyst 3 is lower than the predetermined value, it is assumed that the air fuel ratio sensor 5 causes a rich shift, and hence by inhibiting the update of the air fuel ratio learning value, the mislearning of the addition amount correction factor can be suppressed.

Here, note that the function of the ECU 7 to perform the processing in step S603 in this embodiment corresponds to an air fuel ratio learning value update inhibition device 74 in the present invention.

Embodiment 7

In this seventh embodiment, the basic structure of the hardware, to which the present invention is applied, is common with that of the above-mentioned first embodiment, and hence an explanation thereof is omitted.

Here, if a rich air fuel ratio is continued for an extended period of time during sulfur poisoning recovery operation, the NOx catalyst 3 might overheat, so an idle or stop period is provided so as to make the temperature of the NOx catalyst 3 become the target temperature (see FIG. 2A).

In order to ensure release of sulfur components, a total period of fuel addition (see FIG. 2A) is set to be the longest within the range in which the NOx catalyst 3 does not overheat even if the temperature of the NOx catalyst 3 varies. As a result, a margin for the NOx catalyst 3 to overheat is small.

In this respect, when the amount of added fuel injected from the fuel addition valve 6 under the learning control of the air fuel ratio is corrected, the temperature of the NOx catalyst 3 varies so it becomes necessary to correct the period of time, within which the target air fuel ratio is reached, in accordance with the variation of the temperature of the NOx catalyst 3. Here, note that in this embodiment, description will be made assuming that the period of time within which the target air fuel ratio is reached is equal to a total period of fuel addition.

Here, FIG. 12 illustrates the relation among amounts of correction for the amount of fuel to be added, merits and demerits according to the presence or absence of a correction of the total period of fuel addition (rich time) with respect to an air fuel ratio learning factor at that time, and a determination whether the total period of fuel addition is finally corrected.

First of all, when the amount of fuel to be added is corrected to increase, the following cases can be enumerated as factors or reasons for new learning of the air fuel ratio. That is, the amount of fuel to be added from the fuel addition valve 6 is decreased due to clogging of the fuel addition valve 6 or the like, and the basic air fuel ratio is made lean. In the case of the amount of fuel to be added being corrected to increase, whether or not the total period of fuel addition is corrected in combination therewith results in the following merits (advantages) or demerits (disadvantages).

First, when the amount of fuel actually added from the fuel addition valve 6 is decreased due to clogging of the fuel addition valve 6 or the like, the fuel to be added from the fuel addition valve 6 is increased under the learning control of the air fuel ratio. The increase of fuel in this case is to supplement a decrease in the amount of added fuel, and the amount of added fuel after correction becomes substantially equal to the amount of fuel added when clogging of the fuel addition valve 6 or the like is not caused, that is, equal to a target amount of fuel (hereinafter referred to as a target fuel amount). Therefore, the temperature of the NOx catalyst 3 becomes substantially the same as the target temperature, and hence the amplitude of variation in the temperature of the NOx catalyst 3 (hereinafter referred to as a bed temperature amplitude) becomes substantially the same or unchanged, too. This is indicated as "coincidence with the target" in FIG. 12.

In other words, when the fuel addition valve 6 is clogged, the bed temperature amplitude can be brought into a target value even if the total period of fuel addition is not corrected, which becomes a merit or advantage. In this case, there is no particular demerit or disadvantage due to the total period of fuel addition being not corrected.

In addition, in case where the correction to increase the amount of added fuel resulting from the clogging of the fuel addition valve 6 or the like is carried out, if the total period of fuel addition is corrected to decrease, the amount of the sulfur components to be released per rich spike becomes smaller. Stated in another way, when the amount of fuel to be added is corrected to increase because of the clogging of the fuel addition valve 6 or the like, if the correction to shorten the total period of fuel addition is carried out in combination therewith, there is a demerit that the amount of sulfur components released decreases (in FIG. 12, indicated as "decreased amount of S released"). On the other hand, in case where the amount of fuel to be added is corrected to increase in view of the clogging of the fuel addition valve 6 or the like, the correction to shorten the total fuel addition period provides a merit or advantage that the amplitude of the bed temperature is decreased to more effectively suppress the overheat of the NOx catalyst 3. In this case, the central temperature in the amplitude of the bed temperature becomes substantially the same as the target temperature.

On the other hand, in cases where the amount of fuel injected into engine cylinders is decreased owing to the occurrence of an error in which the measured amount of intake air in the internal combustion engine 1 is smaller than the actual amount thereof, or where the amount of fuel injected into the cylinders is decreased below a target amount due to the aging of the fuel injection valve, etc., the basic air fuel ratio shifts or deviates to a lean side. With this, the air fuel ratio obtained from the air fuel ratio sensor 5 becomes leaner than the target air fuel ratio, so the fuel injected from the fuel addition valve 6 is corrected to increase under the learning control of the air fuel ratio. In this case, an amount of fuel more than the target amount of fuel is added from the fuel addition valve 6. Accordingly, a temperature rise in the NOx catalyst 3 becomes larger after the correction of the fuel addition amount, and the amplitude of the bed temperature also becomes larger. As a result, there will be a fear that the NOx catalyst 3 overheats (in FIG. 12, expressed as "NOx catalyst overheat"). That is, if the total period of fuel addition is not corrected, there will be a demerit that the NOx catalyst 3 overheats. In this case, there will be no particular merit or advantage if the total period of fuel addition is not corrected.

Thus, it is considered that in order to suppress the overheat of the NOx catalyst 3 when the basic air fuel ratio is made lean to correct the amount of fuel added from the fuel addition valve 6, a correction to shorten the total period of fuel addition is carried out. In other words, by shortening the total period of fuel addition in combination with increasing the amount of fuel addition, the amplitude of the bed temperature of the NOx catalyst 3 can be made substantially equal to the target value (in FIG. 12, indicated as "coincidence with the target"), so the overheat of the NOx catalyst 3 can be suppressed. This is a merit or advantage provided by correcting the total period of fuel addition. In this case, there will be no particular demerit or disadvantage due to the correction of the total period of fuel addition.

Here, note that in case where the amount of fuel added from the fuel addition valve 6 is corrected to increase, it is difficult to distinguish whether it is a correction to increase the amount of fuel addition resulting from a decrease in the amount of fuel added from the fuel addition valve 6 or a correction to increase the amount of fuel addition resulting from a lean shift of the basic air fuel ratio. This is because the learning of the air fuel ratio is carried out when fuel is added from the fuel addition valve 6 to bring the air fuel ratio of the NOx catalyst 3 into a rich air fuel ratio. Accordingly, when the total period of fuel addition is corrected to decrease or shorten, the total period of fuel addition is always shortened without distinguishing these corrections from each other. In addition, if the total period of fuel addition is corrected to decrease or shorten when the correction to increase the amount of fuel addition resulting from clogging of the fuel addition valve 6 is performed, there is a rather small demerit or disadvantage that the amount of sulfur components released is decreased as described above, but there can be obtained a great merit or advantage that it is possible to suppress the overheat of the NOx catalyst 3 when the correction to increase the amount of fuel addition resulting from leaning of the basic air fuel ratio is performed.

Therefore, in this embodiment, when the amount of fuel addition is corrected to increase, the correction to shorten the total period of fuel addition is carried out in combination therewith. As a result, the overheat of the NOx catalyst 3 can be suppressed.

On the other hand, when the amount of fuel added from the fuel addition valve 6 becomes more than the target amount of fuel due to various factors such as individual differences, aging or secular change, etc., the amount of fuel injected from the fuel addition valve 6 is corrected to decrease under the learning control of the air fuel ratio. The decrease in the amount of fuel in this case is to counteract an increase in the amount of fuel addition, and hence the amount of fuel addition after this correction becomes substantially equal to the target amount of fuel. Accordingly, the temperature of the NOx catalyst 3 becomes substantially the same as a target temperature, and hence the amplitude of the bed temperature of the NOx catalyst 3 also becomes substantially the same as a target value (indicated as "coincidence with the target").

In other words, when the amount of fuel added from the fuel addition valve 6 is more than the target, the bed temperature amplitude can be brought into a target value even if the total period of fuel addition is not corrected. That is, this will be a merit or advantage due to the total period of fuel addition being not corrected. In this case, there is no particular demerit or disadvantage due to the total period of fuel addition being not corrected.

In addition, in case where a correction to decrease the amount of fuel addition resulting from an increase in the amount of fuel addition is carried out, a correction to lengthen or increase the total fuel addition period provides a demerit or disadvantage that the amplitude of the bed temperature is increased, thus giving rise to a fear that the NOx catalyst 3 might overheat. On the other hand, when the amount of fuel addition increases, there will be no merit or advantage due to the correction to lengthen or increase the total period of fuel addition.

On the other hand, in cases where the amount of fuel added to the engine cylinders is increased owing to the occurrence of an error in which the measured amount of intake air is more than the actual amount thereof, or where the amount of fuel injected into the cylinders is increased above the target amount due to the aging of the fuel injection valve, etc., the basic air fuel ratio shifts or deviates to a rich side. With this, the air fuel ratio obtained from the air fuel ratio sensor 5 becomes richer than the target air fuel ratio, so the fuel injected from the fuel addition valve 6 is corrected to decrease under the learning control of the air fuel ratio. In this case, an amount of fuel less than the target amount of fuel is added from the fuel addition valve 6. Therefore, the amount of sulfur components released per rich spike is decreased if the total period of fuel addition is not corrected. Stated in another way, when the amount of fuel to be added is corrected to decrease, if the correction to lengthen the total period of fuel addition is not carried out, there will be a demerit or disadvantage that the amount of sulfur components released decreases (in FIG. 12, indicated as "decreased amount of S released"). On the other hand, in case where the amount of fuel added from the fuel addition valve 6 is corrected to decrease, if the correction to lengthen the total fuel addition period is not carried out, there will be a merit or advantage that the amplitude of the bed temperature is decreased to more effectively suppress the overheat of the NOx catalyst 3.

Thus, it is considered that in order to increase the amplitude of the bed temperature of the NOx catalyst 3 when the basic air fuel ratio is made rich to correct the amount of fuel added from the fuel addition valve 6, a correction to lengthen the total period of fuel addition is carried out. In other words, by lengthening the total period of fuel addition in combination with decreasing the amount of fuel addition, the amplitude of the bed temperature of the NOx catalyst 3 can be made substantially equal to the target value (in FIG. 12, indicated as "coincidence with the target"). This is a merit or advantage provided by correcting the total period of fuel addition. In this case, there will be no particular demerit or disadvantage due to the correction of the total period of fuel addition.

Here, note that in case where the amount of fuel added from the fuel addition valve 6 is corrected to decrease, it is difficult to distinguish whether it is a correction to decrease the amount of fuel addition resulting from an increase in the amount of fuel added from the fuel addition valve 6 or a correction to decrease the amount of fuel addition resulting from a rich shift of the basic air fuel ratio. Accordingly, when the total period of fuel addition is corrected to increase or lengthen, the total period of fuel addition is always lengthened without distinguishing these corrections from each other. However, if the correction to decrease the amount of fuel addition resulting from an increase in the amount of fuel added from the fuel addition valve 6 is carried out, there will be a fear that the NOx catalyst 3 overheats as described above. In this case, if the correction to lengthen the total period of fuel addition is not carried out, the overheat of the NOx catalyst 3 can be suppressed. Moreover, even in case where the correction to decrease the amount of fuel addition resulting from a rich shift of the basic air fuel ratio is carried out, if the correction to lengthen the total period of fuel addition is not performed, there will be a rather small demerit or disadvantage that the amount of sulfur components released decreases as described above, but it is possible to obtain a large merit or advantage that the overheat of the NOx catalyst 3 can be suppressed.

Therefore, in this embodiment, when the amount of fuel addition is corrected to decrease, the correction to lengthen the total period of fuel addition is not carried out, that is, the total fuel addition period is not changed.

Now, reference will be made to the flow of calculation of a corrected rich time (total period of fuel addition) according to this embodiment.

Figure 13:
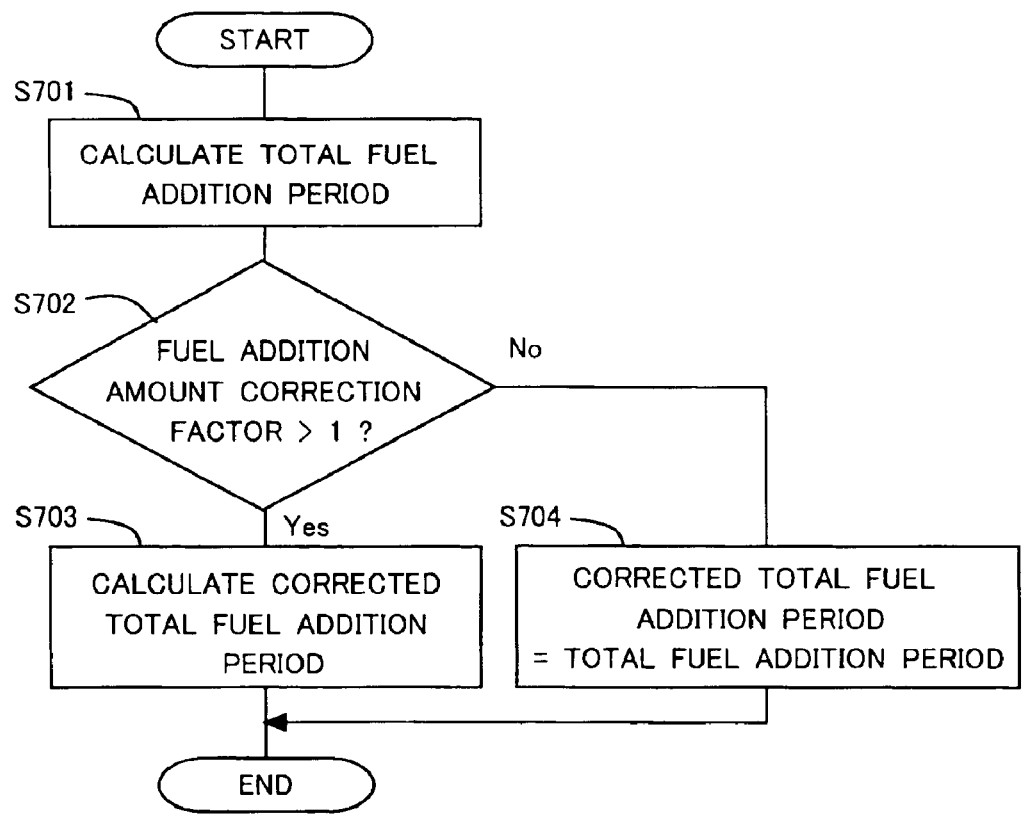
FIG. 13 is a flow chart showing the flow of calculating a corrected rich time according to a seventh embodiment of the present invention.

FIG. 13 is a flow chart that illustrates the flow of calculating a corrected rich time according to a seventh embodiment of the present invention.

This flow is executed after the fuel addition amount correction factor has been calculated according to the above-mentioned embodiments.

In step S701, the total period of fuel addition is calculated. The total period of fuel addition in this embodiment is the same as the total period of fuel addition calculated in the catalyst rich control as described in the first embodiment, and is calculated by using a map which has been set beforehand according to the number of revolutions per minute of the internal combustion engine 1 and the load thereof (the degree of opening of the accelerator pedal or the amount of fuel injected into each cylinder).

In step S702, it is determined whether the fuel addition amount correction factor is greater than 1.

Here, the addition amount correction factor calculated in the above-mentioned embodiments is used. The addition amount correction factor being greater than 1 means that the amount of fuel added from the fuel addition valve 6 is corrected to an increase side.

When an affirmative determination is made in step S702, the control flow proceeds to step S703, whereas when a negative determination is made in step S702, the control flow proceeds to step S704.

In step S703, the total period of fuel addition calculated in step S701 is corrected (i.e., a corrected total period of fuel addition is calculated). The corrected total period of fuel addition is calculated by the following expression in such a manner that it becomes shorter in accordance with the increasing fuel addition amount correction factor.

Corrected total period of fuel addition=total period of fuel addition/(fuel addition amount correction factor×sensitivity factor)

Here, note that the sensitivity factor is a value decided by the temperature of the NOx catalyst 3 and the fuel addition amount correction factor, and it is obtained through experiments or the like and formed into a map beforehand. Here, the speed and rate at which the added fuel reacts with the NOx catalyst 3 vary according to the temperature of the NOx catalyst 3, so the sensitivity factor is set so as to adjust the rise rate of the temperature of the NOx catalyst 3. In this regard, note that the sensitivity factor may be set as 1 at all times for simplified processing.

In addition, the relation between the total period of fuel addition and the fuel addition amount correction factor may be formed into a map beforehand, so that the corrected total period of fuel addition can be obtained from this map.

In step S704, the total period of fuel addition is set to the value calculated in step S701.

Thus, in case where the fuel addition amount correction factor is greater than 1, that is, only when the amount of fuel addition is corrected to increase, it is possible to perform a correction to shorten the total period of fuel addition. As a result, the overheat of the NOx catalyst 3 upon correction of the amount of fuel addition can be suppressed.

Although in this embodiment, reference has been made to the correction of the total period of fuel addition, the present invention can instead be applied to the case where the period of formation of a rich spike (see FIG. 2B) is corrected.

Embodiment 8

In this eighth embodiment, the basic structure of the hardware, to which the present invention is applied, is common with that of the above-mentioned first embodiment, and hence an explanation thereof is omitted.

Here, note that in the above-mentioned embodiments, the total period of fuel addition is corrected based on the calculated fuel addition amount correction factor, but the amount of sulfur components released decreases when the corrected total period of fuel addition is shortened due to the correction to increase the amount of fuel addition. That is, as the time within which the air fuel ratio is brought into the target air fuel ratio becomes shorter during the time when fuel is being supplied, the amount of sulfur components decreases. In addition, when the time within which the target fuel ratio is reached during fuel is being supplied becomes shorter than the shortest time (e.g., 3 seconds) from the time point at which an exhaust gas of a rich air fuel ratio is introduced into the NOx catalyst 3 to the time point at which release of sulfur components from the NOx catalyst 3 begins, sulfur components becomes unable to be released from the NOx catalyst 3. In this case, sulfur poisoning can not be recovered even if fuel is added from the fuel addition valve 6, so fuel is consumed uselessly, thus resulting in a deterioration in fuel mileage.

Accordingly, in this embodiment, when the time within which the target air fuel ratio is reached at the time of fuel being supplied becomes shorter than a predetermined time (e.g., 3 seconds), the fuel added from the fuel addition valve 6 is temporarily inhibited. Here, note that in this embodiment, description will be made assuming that the period of time within which the target air fuel ratio is reached is equal to the total period of fuel addition.

Now, reference will be made to the flow of operation to make a determination as to whether sulfur poisoning recovery control is performed according to this embodiment.

Figure 14:
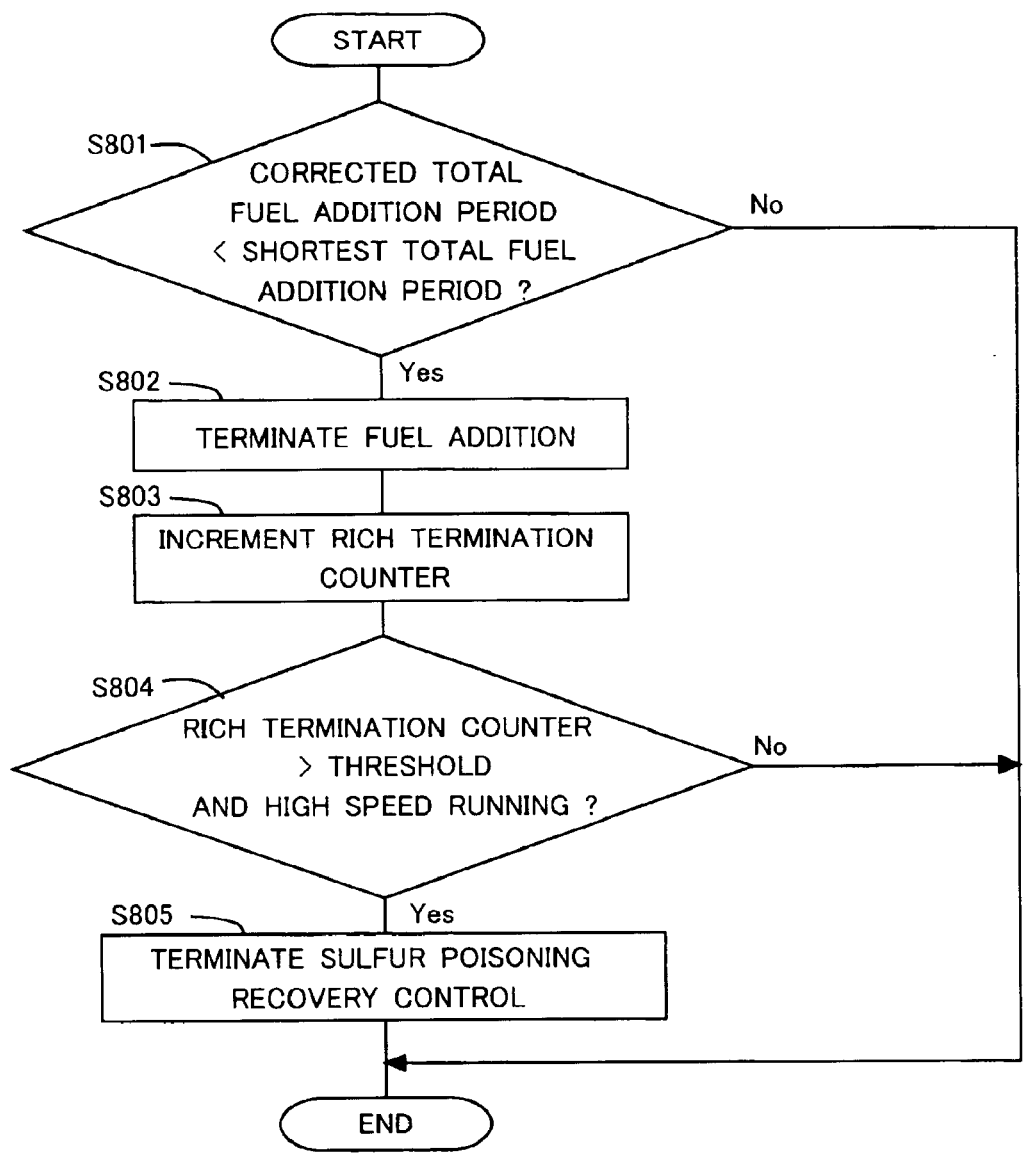
FIG. 14 is a flow chart showing the flow of operation to determine whether sulfur poisoning recovery control is performed according to an eighth embodiment of the present invention.

FIG. 14 is a flow chart that illustrates the flow of operation to determine whether sulfur poisoning recovery control is performed according to the eighth embodiment of the present invention.

This flow is executed after the corrected total period of fuel addition has been calculated according to the above-mentioned embodiments.

In step S801, it is determined whether the corrected total period of fuel addition is shorter than the shortest total period of fuel addition. The shortest total period of fuel addition is a minimum time from the introduction of an exhaust gas of a rich air fuel ratio into the NOx catalyst 3 to the start of release of sulfur components therefrom, and is set to 3 seconds for example.

When an affirmative determination is made in step S801, the control flow proceeds to step S802, whereas when a negative determination is made in step S801, this routine is ended.

In step S802, the addition of fuel to release sulfur components from the NOx catalyst 3 is terminated. However, the addition of fuel to maintain the bed temperature of the NOx catalyst 3 to some degree is continued so as to make it possible to resume recovery from sulfur poisoning at once.

In step S803, the value of a rich termination counter, which serves to count the time elapsed after the addition of fuel for recovery from sulfur poisoning is terminated, is incremented.

In step S804, it is determined whether the count value of the rich termination counter is greater than a threshold, and whether a vehicle with the internal combustion engine 1 and the air fuel ratio control apparatus of the present invention installed thereon is in a high-speed running state. Here, note that the "threshold" is a value that is decided to suppress a deterioration in fuel mileage or consumption. That is, when the control to maintain the bed temperature of the NOx catalyst 3 is still performed even if the rich termination counter exceeds the threshold, recovery from sulfur poisoning is not expected but also fuel is consumed wastefully, thus worsening fuel mileage. In addition, when the vehicle is in the low-speed running state, there is a possibility that sulfur poisoning recovery processing can be performed at once. Accordingly, when the count value of the rich termination counter becomes greater than the threshold, and when the vehicle is in the high-speed running state, the sulfur poisoning recovery control is terminated.

When an affirmative determination is made in step S804, the control flow proceeds to step S805, whereas when a negative determination is made in step S804, the control flow is ended.

In step S805, the sulfur poisoning recovery processing is terminated. Here, note that the NOx catalyst 3 has not been recovered from sulfur recovery, and hence if sulfur poisoning recovery processing is started based on the amount of sulfur poisoning in the NOx catalyst 3, sulfur poisoning control is commenced at once. Therefore, to avoid such a situation, the sulfur poisoning recovery processing is not carried out until a predetermined time has elapsed or until the vehicle has traveled a predetermined distance.

In this manner, unnecessary or useless consumption of fuel can be suppressed, and fuel mileage can be improved.

Although in this embodiment, reference has been made to the case where the total period of fuel addition is corrected, the present invention can instead be applied to the case where the period of formation of a rich spike (see FIG. 2B) is corrected.

While the invention has been described in terms of preferred embodiments, those skilled in the art will recognize that the invention can be practiced with modifications within the spirit and scope of the appended claims.

What is claimed is:

1. An air fuel ratio control apparatus for an internal combustion engine, including an exhaust gas purification device provided on an exhaust passage of an internal combustion engine, an air fuel ratio detection device disposed at a location downstream of said exhaust gas purification device, an air fuel ratio feedback value calculation device that calculates an air fuel ratio feedback value based on a difference between an air fuel ratio of a mixture detected by said air fuel ratio detection device and a target air fuel ratio, an air fuel ratio learning value calculation device that calculates an air fuel ratio learning value based on said air fuel ratio feedback value and said target air fuel ratio, and an exhaust gas air fuel ratio control device that controls the air fuel ratio of an exhaust gas flowing into said exhaust gas purification device based on said air fuel ratio feedback value and said air fuel ratio learning value, said apparatus comprising:

a temperature detection device that detects the temperature of said exhaust gas purification device;

a determination device that makes a determination that when a difference between a detection value of said temperature detection device and a target temperature is greater than a specified range, the detection value of said air fuel ratio detection device shifts to a rich side, whereas when said difference is less than said specified range, the detection value of said air fuel ratio detection device shifts to a lean side; and an air fuel ratio learning value update inhibition device that inhibits the update of said air fuel ratio learning value when said determination device determines that the detection value of said air fuel ratio detection device shifts to a rich side or to a lean side.

2. An air fuel ratio control apparatus for an internal combustion engine, including an NOx storage reduction catalyst provided on an exhaust passage of an internal combustion engine, a fuel supply device that supplies fuel at a location upstream of said NOx storage reduction catalyst, an air fuel ratio detection device that detects the air fuel ratio of an exhaust gas passing through said NOx storage reduction catalyst, and a temperature detection device that detects the temperature of said NOx storage reduction catalyst, wherein when sulfur components occluded in said NOx storage reduction catalyst become more than or equal to a specified amount, the temperature of said NOx storage reduction catalyst is brought into a specified temperature, and the sulfur components occluded in said NOx storage reduction catalyst are caused to release therefrom by controlling the amount of fuel supplied from said fuel supply device and/or the interval of fuel supply based on detection values of said air fuel ratio detection device and said temperature detection device so as to bring the air fuel ratio of the exhaust gas passing through said NOx storage reduction catalyst into a stoichiometric air fuel ratio or a specified rich air fuel ratio; and said air fuel ratio learning value is updated only when an increase or decrease in said amount of fuel and/or an increase or decrease in said fuel supply interval, respectively obtained from a temperature learning value and an air fuel ratio learning value, coincide with each other, said temperature learning value being calculated so as to change a basic value of said amount of fuel and/or a basic value of said fuel supply interval from a difference between said specified temperature and the temperature detected by said temperature detection device, said air fuel ratio learning value being calculated so as to change a basic value of said amount of fuel and/or a basic value of said fuel supply interval from a difference between said specified air fuel ratio and the air fuel ratio detected by said air fuel ratio detection device.

3. The air fuel ratio control apparatus for an internal combustion engine as set forth in claim 2, wherein the amount of fuel supplied and/or the interval of fuel supply are controlled based on said air fuel ratio learning value and said temperature learning value.

4. The air fuel ratio control apparatus for an internal combustion engine as set forth in claim 2, wherein when said temperature learning value is calculated, said air fuel ratio learning value is prevented from changing.

5. The air fuel ratio control apparatus for an internal combustion engine as set forth in claim 2, wherein when the amount of fuel supplied from said fuel supply device is controlled to increase based on said air fuel ratio learning value, the time within which the air fuel ratio of said exhaust gas passing through said NOx storage reduction catalyst is brought into a stoichiometric air fuel ratio or a specified rich air fuel ratio is made shorter in accordance with the increasing fuel supply amount, whereas when the amount of fuel supplied from said fuel supply device is controlled to decrease, said time within which said stoichiometric air fuel ratio or said specified rich air fuel ratio is reached is not changed before and after said amount of fuel supplied is decreased.

6. The air fuel ratio control apparatus for an internal combustion engine as set forth in claim 5, wherein when the amount of fuel supplied from said fuel supply device is increased, and when said time within which said stoichiometric air fuel ratio or said specified rich air fuel ratio is reached becomes less than or equal to a predetermined time due to the shortening of said time within which said stoichiometric air fuel ratio or said specified rich air fuel ratio is reached, release of sulfur components from said NOx storage reduction catalyst due to the fuel supplied thereto from said fuel supply device is interrupted.

7. An air fuel ratio control apparatus for an internal combustion engine, including an exhaust gas purification device provided on an exhaust passage of an internal combustion engine, an air fuel ratio detection device disposed at a location downstream of said exhaust gas purification device, an air fuel ratio feedback value calculation device that calculates an air fuel ratio feedback value based on a difference between an air fuel ratio of a mixture detected by said air fuel ratio detection device and a target air fuel ratio, an air fuel ratio learning value calculation device that calculates an air fuel ratio learning value based on said air fuel ratio feedback value and said target air fuel ratio, and an exhaust gas air fuel ratio control device that controls the air fuel ratio of an exhaust gas flowing into said exhaust gas purification device based on said air fuel ratio feedback value and said air fuel ratio learning value, said apparatus comprising:

a temperature detection device that detects the temperature of said exhaust gas purification device;

a temperature feedback value calculation device that calculates a temperature feedback value based on a difference between the temperature of said exhaust gas purification device detected by said temperature detection device and a target temperature;

a temperature learning value calculation device that calculates a temperature learning value based on said temperature feedback value calculated by said temperature feedback value calculation device and said target temperature; and an air fuel ratio learning value update determination device that determines whether said air fuel ratio learning value is updated, based on an increase or a decrease in the amount of fuel and/or an increase or a decrease in the interval of fuel supply, respectively obtained from said air fuel ratio learning value, which is calculated by said air fuel ratio learning value calculation device, and said temperature learning value, which is calculated by said temperature learning value calculation device.

8. The air fuel ratio control apparatus for an internal combustion engine as set forth in claim 7, wherein said air fuel ratio learning value update determination device updates said air fuel ratio learning value only when an increase or a decrease in the amount of fuel and/or an increase or a decrease in the interval of fuel supply, respectively obtained by said air fuel ratio learning value calculated by said air fuel ratio learning value calculation device and said temperature learning value calculated by said temperature learning value calculation device, coincide with each other.

9. The air fuel ratio control apparatus for an internal combustion engine as set forth in claim 7, further comprising:
   a determination device that makes a determination that when a difference between the detection value of said temperature detection device and said target temperature is greater than a specified range, the detection value of said air fuel ratio detection device shifts to a rich side, whereas when said difference is less than said specified range, the detection value of said air fuel ratio detection device shifts to a lean side; and
   an air fuel ratio learning value update inhibition device that inhibits the update of said air fuel ratio learning value when said determination device determines that the detection value of said air fuel ratio detection device shifts to a rich side or to a lean side.

10. The air fuel ratio control apparatus for an internal combustion engine as set forth in claim 7, wherein said exhaust gas air fuel ratio control device comprises a fuel supply device disposed at a location upstream of said exhaust gas purification device for controlling the amount of fuel supplied from said fuel supply device and/or the interval of fuel supply based on said air fuel ratio feedback value, said air fuel ratio learning value, said temperature feedback value and said temperature learning value.

11. The air fuel ratio control apparatus for an internal combustion engine as set forth in claim 9, wherein when said determination device makes a determination that the detection value of said air fuel ratio detection device shifts to a lean side from an actual air fuel ratio, correction of said fuel supply amount and/or said fuel supply interval toward a side to make said air fuel ratio lower is limited.

12. The air fuel ratio control apparatus for an internal combustion engine as set forth in claim 9, wherein when said determination device determines that the detection value of said air fuel ratio detection device shifts to a rich side from an actual air fuel ratio, correction of said fuel supply amount and/or said fuel supply interval toward a side to make said air fuel ratio higher is not limited.

13. The air fuel ratio control apparatus for an internal combustion engine as set forth in claim 7, wherein when said temperature learning value is calculated, said air fuel ratio learning value is prevented from changing.

14. The air fuel ratio control apparatus for an internal combustion engine as set forth in claim 10, wherein when the amount of fuel supplied from said fuel supply device is controlled to increase based on said air fuel ratio learning value, the time within which the air fuel ratio of said exhaust gas flowing into said exhaust gas purification device is brought into a target air fuel ratio due to the fuel supplied thereto from said fuel supply device is made shorter in accordance with the increasing fuel supply amount, whereas when the amount of fuel supplied from said fuel supply device is controlled to decrease, the time within which said target air fuel ratio is reached is not changed before and after said amount of fuel supplied is decreased.

15. The air fuel ratio control apparatus for an internal combustion engine as set forth in claim 14, wherein when the amount of fuel supplied from said fuel supply device is increased, and when the time within which the air fuel ratio of said exhaust gas flowing into said exhaust gas purification device is brought into a target air fuel ratio due to the fuel supplied thereto from said fuel supply device becomes less than or equal to a predetermined time due to the shortening of said time within which said target air fuel ratio is reached, the supply of fuel from said fuel supply device is interrupted.

* * * * *